US012350835B2

(12) United States Patent
Casas et al.

(10) Patent No.: US 12,350,835 B2
(45) Date of Patent: *Jul. 8, 2025

(54) SYSTEMS AND METHODS FOR SENSOR DATA PACKET PROCESSING AND SPATIAL MEMORY UPDATING FOR ROBOTIC PLATFORMS

(71) Applicant: Aurora Operations, Inc., Pittsburgh, PA (US)

(72) Inventors: Sergio Casas, Toronto (CA); Davi Eugenio Nascimento Frossard, Toronto (CA); Shun Da Suo, Toronto (CA); Xuanyuan Tu, Toronto (CA); Raquel Urtasun, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,288

(22) Filed: May 21, 2024

(65) Prior Publication Data
US 2024/0391097 A1    Nov. 28, 2024

Related U.S. Application Data

(63) Continuation of application No. 17/388,848, filed on Jul. 29, 2021, now Pat. No. 12,023,812.
(Continued)

(51) Int. Cl.
*B25J 9/16* (2006.01)
*G01S 17/89* (2020.01)
(Continued)

(52) U.S. Cl.
CPC .............. *B25J 9/163* (2013.01); *B25J 9/161* (2013.01); *B25J 9/1664* (2013.01); *G01S 17/89* (2013.01); *G06F 18/253* (2023.01); *G06N 3/084* (2013.01)

(58) Field of Classification Search
CPC .......... B25J 9/163; B25J 9/161; B25J 9/1664; G01S 17/89; G06F 18/253; G06N 3/084;
(Continued)

(56) References Cited

U.S. PATENT DOCUMENTS 10,203,210 B1    2/2019  Tagawa et al.
10,268,191 B1    4/2019  Lockwood et al.
(Continued)

OTHER PUBLICATIONS

Alismail et al., "Continuous Trajectory Estimation for 3D SLAM from Actuated Lidar", International Conference on Robotics and Automation, Jul. 27-29, 2022, Chicago, Illinois, United States, 6 pages.
(Continued)

*Primary Examiner* — Jaime Figueroa
(74) *Attorney, Agent, or Firm* — Dority & Manning, P.A.

(57) ABSTRACT

Systems and methods for streaming sensor packets in real-time are provided. An example method includes obtaining a sensor data packet representing a first portion of a three-hundred and sixty degree view of a surrounding environment of a robotic platform. The method includes generating, using machine-learned model(s), a local feature map based at least in part on the sensor data packet. The local feature map is indicative of local feature(s) associated with the first portion of the three-hundred and sixty degree view. The method includes updating, based at least in part on the local feature map, a spatial map to include the local feature(s). The spatial map includes previously extracted local features associated with a previous sensor data packet representing a different portion of the three-hundred and sixty degree view than the first portion. The method includes determining an object within the surrounding environment based on the updated spatial map.

20 Claims, 12 Drawing Sheets

Related U.S. Application Data

(60) Provisional application No. 63/058,043, filed on Jul. 29, 2020.

(51) Int. Cl.
*G06F 18/25* (2023.01)
*G06N 3/084* (2023.01)
*G06N 20/00* (2019.01)
*G06V 10/82* (2022.01)

(58) Field of Classification Search
CPC ........ G06N 3/045; G06N 20/00; G06V 10/82; G06V 20/58
USPC ................ 700/245–264; 318/568.11–568.25
See application file for complete search history.

(56) References Cited

U.S. PATENT DOCUMENTS

| | | | |
|---|---|---|---|
| 10,593,043 B2* | 3/2020 | Lin ...................... | G06V 40/103 |
| 10,659,751 B1 | 5/2020 | Briggs et al. | |
| 10,860,034 B1 | 12/2020 | Ziyace et al. | |
| 11,016,495 B2 | 5/2021 | Palanisamy et al. | |
| 11,113,583 B2 | 9/2021 | Kobayashi | |
| 11,221,413 B2* | 1/2022 | Liang ...................... | G01S 17/931 |
| 11,375,352 B2 | 6/2022 | Dorrance et al. | |
| 11,500,099 B2* | 11/2022 | Liang ...................... | G06N 3/02 |
| 11,630,998 B2* | 4/2023 | Khan ...................... | G01S 13/931 701/2 |
| 11,688,081 B2* | 6/2023 | Yang ...................... | G06V 20/10 382/103 |
| 12,037,025 B2* | 7/2024 | Cui ...................... | G06N 3/006 |
| 2004/0208372 A1* | 10/2004 | Boncyk ............ | H04N 1/00068 707/E17.023 |
| 2016/0005229 A1* | 1/2016 | Lee ...................... | G06T 11/60 345/419 |
| 2018/0232887 A1 | 8/2018 | Lin et al. | |
| 2018/0299274 A1* | 10/2018 | Moghe ............... | G01C 21/3896 |
| 2019/0176841 A1* | 6/2019 | Englard ............... | G01S 7/4026 |
| 2019/0384302 A1 | 12/2019 | Silva et al. | |
| 2020/0025931 A1* | 1/2020 | Liang ...................... | G06F 18/251 |
| 2020/0025935 A1* | 1/2020 | Liang ...................... | G06V 20/64 |
| 2020/0056892 A1* | 2/2020 | Haque ...................... | G01C 21/28 |
| 2020/0098135 A1* | 3/2020 | Ganjineh ............ | G06V 20/588 |
| 2020/0134372 A1* | 4/2020 | Roy Chowdhury . | G05D 1/0221 |
| 2020/0175691 A1* | 6/2020 | Zhang ...................... | G06T 7/248 |
| 2020/0209860 A1 | 7/2020 | Zhang | |
| 2020/0245115 A1 | 7/2020 | Dorrance et al. | |
| 2020/0263992 A1* | 8/2020 | Gaal ...................... | G01C 21/3841 |
| 2020/0263995 A1* | 8/2020 | Gaal ...................... | G01C 21/3815 |
| 2020/0280707 A1 | 9/2020 | Briggs et al. | |
| 2020/0302222 A1 | 9/2020 | Kobayashi | |
| 2020/0401823 A1 | 12/2020 | Miller et al. | |
| 2021/0009080 A1* | 1/2021 | Hu ...................... | G06V 10/454 |
| 2021/0073570 A1* | 3/2021 | Yang ...................... | B25J 9/1664 |
| 2021/0133474 A1 | 5/2021 | Sawada | |
| 2021/0150230 A1 | 5/2021 | Smolyanskiy et al. | |
| 2021/0156963 A1 | 5/2021 | Popov et al. | |
| 2021/0232857 A1 | 7/2021 | Jung et al. | |
| 2021/0326678 A1 | 10/2021 | Smolyanskiy et al. | |
| 2021/0342609 A1 | 11/2021 | Smolyanskiy et al. | |
| 2022/0153309 A1* | 5/2022 | Cui ...................... | G06N 3/088 |
| 2022/0161815 A1 | 5/2022 | Van Beek et al. | |
| 2023/0127115 A1* | 4/2023 | Liang ...................... | G06N 3/04 356/4.01 |

OTHER PUBLICATIONS

Casas et al., "IntentNet: Learning to Predict Intention from Raw Sensor Data", arXiv:2101.07907v1, Jan. 20, 2021, 10 pages.
Chen et al., "Fast Point R-CNN", arXiv:1908.02990v2, Aug. 16, 2019, 10 pages.
Chen et al., "Multi-View 3D Object Detection Network for Autonomous Driving", arXiv:1611.07759v3, Jan. 16, 2017, 9 pages.
Hua et al., "Pointwise Convolutional Neural Networks", arXiv:1712.05245v2, Mar. 29, 2018, 10 pages.
Lang et al., "PointPillars: Fast Encoders for Object Detection from Point Clouds", arXiv:1812.05784v2, May 7, 2019, 9 pages.
Li et al., "PointCNN: Convolution on X-Transformed Points", arXiv:1801.07791v5, 14 pages.
Li et al., "Towards Streaming Perception", arXiv:2005.10420v2, Aug. 25, 2020, 39 pages.
Li et al., "Vehicle Detection from 3D Lidar Using Fully Convolutional Network", arXiv:1608.07916v1, Aug. 29, 2016, 8 pages.
Li, "3D Fully Convolutional Network for Vehicle Detection in Point Cloud", arXiv:1611.08069v2, Jan. 16, 2017, 5 pages.
Luo et al., "Fast and Furious: Real Time End-to-End 3D Detection, Tracking and Motion Forecasting with a Single Convolutional Net", arXiv:2012.12395v1, Dec. 22, 2020, 9 pages.
Maturana et al., "VoxNet: A 3D Convolutional Neural Network for Real-Time Object Recognition", International Conference on Intelligent Robots and Systems, Sep. 28-Oct. 2, 2015, Hamburg, Germany, 7 pages.
Meyer et al., "LaserNet: An Efficient Probabilistic 3D Object Detector for Autonomous Driving", arXiv:1903.08701v1, Mar. 20, 2019, 10 pages.
Qi et al., "Frustum PointNets for 3D Object Detection from RGB-D Data", arXiv:1711.08488v2, Apr. 13, 2018, 15 pages.
Qi et al., "PointNet: Deep Learning on Point Sets for 3D Classification and Segmentation", arXiv:1612.00593v2, Apr. 10, 2017, 19 pages.
Ren et al., "Faster R-CNN: Towards Real-Time Object Detection with Region Proposal Networks", arXiv:1506.01497v3. Jan. 6, 2016, 14 pages.
Ren et al., "SBNet: Sparse Blocks Network for Fast Inference", Conference on Computer Vision and Pattern Recognition, Jun. 18-22, 2018, Salt Lake City, Utah, United States, pp. 8711-8720.
Riegler et al., "OctNet: Learning Deep 3D Representations at High Resolutions", arXiv:1611.05009v4, Apr. 10, 2017, 21 pages.
Shi et al., "PointRCNN: 3D Object Proposal Generation and Detection from Point Cloud", arXiv:1812.04244v2, May 16, 2019, 10 pages.
Shi et al., "PV-RCNN: Point-Voxel Feature Set Abstraction for 3D Object Detection", arXiv:1912.13192v2, Apr. 9, 2021, 11 pages.
Wang et al., "Deep Parametric Continuous Convolutional Neural Networks", arXiv:2101.06742v1, Jan. 17, 2021, 18 pages.
Wu et al., "3D ShapeNets: A Deep Representation for Volumetric Shapes", arXiv:1406.5670v3, Apr. 15, 2015, 9 pages.
Xiong et al., "Deformable Filter Convolution for Point Cloud Reasoning", arXiv:1907.13079v1, Jul. 30, 2019, 12 pages.
Yang et al., "HDNET: Exploiting HD Maps for 3D Object Detection", arXiv:2012.11704v1, Dec. 21, 2020, 10 pages.
Yang et al., "PIXOR: Real-time 3D Object Detection from Point Clouds", arXiv:1902.06326v3, Mar. 2, 2019, 10 pages.
Yang et al., "STD: Sparse-to-Dense 3D Object Detector for Point Cloud", arXiv:1907.10471v1, Jul. 22, 2019, 9 pages.
Zhang et al., "Low-Drift and Real-Time Lidar Odometry and Mapping", Autonomous Robot, vol. 41, 2017, pp. 401-416.
Zhou et al., "End-to-End Multi-View Fusion for 3D Object Detection in LiDAR Point Clouds", arXiv:1910.06528v2, Oct. 23, 2019, 10 pages.

* cited by examiner

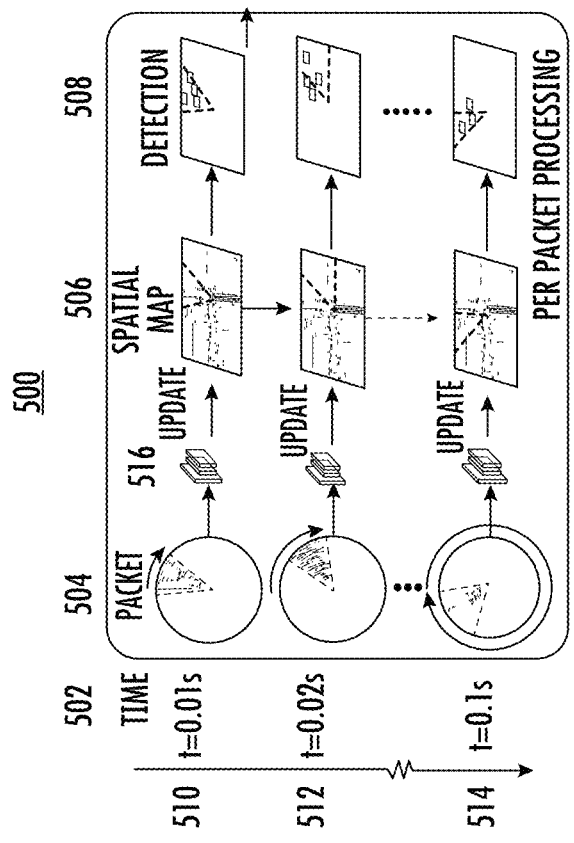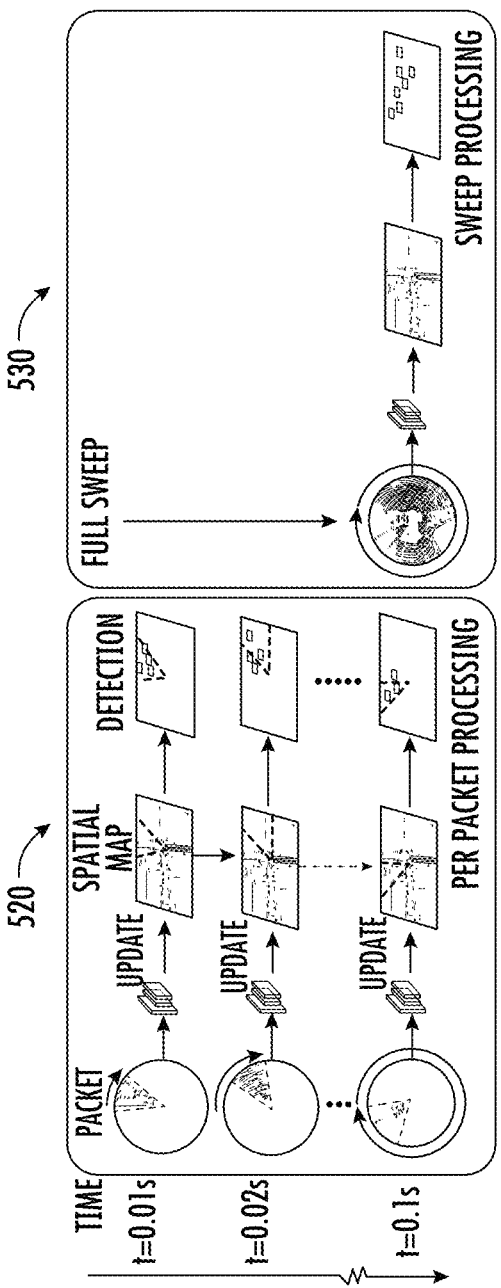
FIG. 5A
FIG. 5B

SYSTEMS AND METHODS FOR SENSOR DATA PACKET PROCESSING AND SPATIAL MEMORY UPDATING FOR ROBOTIC PLATFORMS

RELATED APPLICATION

The present application is based on and claims the benefit of U.S. Provisional Patent Application No. 63/058,043 having a filing date of Jul. 29, 2020, and U.S. patent application Ser. No. 17/388,848 having a filing date of Jul. 29, 2021, which are incorporated by reference herein.

BACKGROUND

Robots, including autonomous vehicles, can receive data that is used to perceive an environment through which the robot can travel. Robots can rely on machine-learned models to detect objects within an environment. The effective operation of a robot can depend on accurate object detection provided by the machine-learned models. Various machine-learned training techniques can be applied to improve such object detection.

SUMMARY

The present disclosure relates generally to improving the ability of a robotic platform to perceive its environment and control its operation. In particular, the present disclosure relates to using machine-learned model(s) for individually processing sensor data packets in a streaming manner to update a robot's spatial memory for improved environmental awareness.

Aspects and advantages of embodiments of the present disclosure will be set forth in part in the following description, or may be learned from the description, or may be learned through practice of the embodiments.

In an aspect, the present disclosure provides a computing system comprising one or more processors and one or more computer-readable medium storing instructions that when executed by the one or more processors cause the computing system to perform operations. The operations may comprise obtaining a first sensor data packet representing a first portion of a view of a surrounding environment of an autonomous vehicle. The operations may comprise generating, using one or more first machine-learned models, a first local feature map based at least in part on the first sensor data packet. In some implementations, the first local feature map may be indicative of one or more first local features associated with the first portion of the view of the surrounding environment. The operations may comprise updating, based at least in part on the first local feature map, a spatial map to include the first local features. In some implementations, the spatial map may comprise previously extracted local features associated with a previous sensor data packet representing a different portion of the view of the surrounding environment than the first portion. The operations may comprise determining an object within the surrounding environment of the autonomous vehicle based at least in part on the spatial map including the first local features.

In some implementations, updating the spatial map includes processing the first local feature map with one or more second machine-learned models.

In some implementations, the one or more second machine-learned models are configured to interpolate the first local feature map to a scale and perform feature-wise concatenation of the first local feature map and the spatial map to update the spatial map based at least in part on the first sensor data packet.

In some implementations, the operations include obtaining a second sensor data packet representing a second portion of the view of the surrounding environment of the autonomous vehicle, generating, using the one or more first machine-learned models, a second local feature map based at least in part on the second sensor data packet, and updating, based at least in part on the second local feature map, the spatial map to include the one or more second local features.

In some implementations, the second local feature map is indicative of one or more second local features associated with the second portion of the view of the surrounding environment.

In some implementations, the spatial map includes the one or more first local features.

In some implementations, generating the first local feature map includes generating a two-dimensional representation associated with the first portion of the view of the surrounding environment of the autonomous vehicle.

In some implementations, determining the object includes obtaining map data and fusing the map data with the spatial map.

In some implementations, the operations include obtaining a second sensor data packet representing a second portion of the view of the surrounding environment of the autonomous vehicle, generating, using the one or more first machine-learned models, a second local feature map based at least in part on the second sensor data packet, updating the spatial map that includes the one or more first local features to include one or more second local features associated with the second local feature map, and determining a second object within the surrounding environment of the autonomous vehicle based at least in part on the spatial map including the first local features and the second local features.

In some implementations, the first sensor data packet is obtained in a streaming manner at a first time when the first sensor data packet is acquired through a sensor system.

In some implementations, the second sensor data packet is obtained in the streaming manner at a second time when the second sensor data packet is acquired through the sensor system after the first sensor data packet.

In some implementations, the one or more first machine-learned models are trained sequentially with a plurality of training data sets and using backpropagation, in which each training data set represents training packets at sequential time steps.

In some implementations, the first sensor data packet includes three-dimensional point cloud data generated with one or more LIDAR sensors, in which the one or more LIDAR sensors are rotated to generate sensor data packets for each respective portion of the view.

In some implementations, the first portion is associated with a degree slice of the view, and in some implementations, the degree slice is between thirty degrees and forty-five degrees.

In some implementations, the first local features include positional data associated with the object in the first portion of the view of the surrounding environment of the autonomous vehicle.

In another aspect, the present disclosure provides a an autonomous vehicle comprising one or more sensors, one or more processors, and one or more computer-readable medium storing instructions that when executed by the one or more processors cause the autonomous vehicle to perform operations. The operations may comprise obtaining, through the one or more sensors, a first sensor data packet representing a first portion of a view of a surrounding environment of the autonomous vehicle. The operations may comprise generating, using one or more machine-learned models, a first local feature map based at least in part on the first sensor data packet. In some implementations, the first local feature map may be indicative of one or more first local features associated with the first portion of the view of the surrounding environment. The operations may comprise updating a spatial map to include the first local features. In some implementations, the spatial map may comprise previously extracted local features associated with a previous sensor data packet representing a different portion of the view of the surrounding environment than the first portion. The operations may comprise determining an object within the surrounding environment of the autonomous vehicle based at least in part on the spatial map including the first local features.

In some implementations, updating the spatial map includes replacing one or more previous computations of the spatial map with the one or more first local features.

In some implementations, updating the spatial map includes obtaining previous computations descriptive of past computations for previous sensor data packets and updating spatial memory based on the previous sensor data packets and the first local feature map to update the spatial map.

In some implementations, the spatial map is descriptive of past local feature maps generated by processing previously obtained sensor data packets.

In some implementations, the operations include obtaining a second sensor data packet representing a second portion of the view of the surrounding environment of the autonomous vehicle, generating, using one or more machine-learned models, a second local feature map based at least in part on the second sensor data packet, and updating the spatial map that includes the one or more first local features to include one or more second local features associated with the second local feature map.

In some implementations, the second local feature map is generated after the first local feature map is generated.

In some implementations, the one or more machine-learned models are trained to: process the first sensor data packet to generate a two-dimensional representation of the view and perform two-dimensional convolutions on the two-dimensional representation to generate the first local feature map.

In some implementations, determining the object includes processing the spatial map with one or more classification models to generate a classification for the one or more first local features. In some implementations, the object is partially occluded from a field of view of at least of the one or more sensors.

In another aspect, the present disclosure provides an autonomous vehicle control system comprising one or more processors and one or more computer-readable medium storing instructions that when executed by the one or more processors cause the autonomous vehicle control system to perform operations. The operations may comprise obtaining (e.g., by a computing system including one or more processors, etc.) a first sensor data packet representing a first portion of a view of a surrounding environment of an autonomous vehicle. The operations may comprise generating (e.g., by the computing system, etc.), using one or more machine-learned models, a first local feature map based at least in part on the first sensor data packet. In some implementations, the first local feature map may be indicative of one or more first local features associated with the first portion of the view of the surrounding environment. The operations may comprise updating (e.g., by the computing system, etc.) a spatial map to include the first local features. The spatial map may comprise previously extracted local features associated with a previous sensor data packet representing a different portion of the view of the surrounding environment than the first portion. In some implementations, the operations may comprise determining (e.g., by the computing system, etc.) an object within the surrounding environment of the autonomous vehicle based at least in part on the spatial map including the first local features.

In another aspect, the present disclosure provides a computer-implemented method for object determination. The method may comprise obtaining (e.g., by a computing system including one or more processors, etc.) a first sensor data packet representing a first portion of a view of a surrounding environment of a robotic platform. The method may comprise generating (e.g., by the computing system, etc.), using one or more machine-learned models, a first local feature map based at least in part on the first sensor data packet. In some implementations, the first local feature map may be indicative of one or more first local features associated with the first portion of the view of the surrounding environment. The method may comprise updating (e.g., by the computing system, etc.) a spatial map to include the first local features. The spatial map may comprise previously extracted local features associated with a previous sensor data packet representing a different portion of the view of the surrounding environment than the first portion. In some implementations, the method may comprise determining (e.g., by the computing system, etc.) an object within the surrounding environment of the robotic platform based at least in part on the spatial map including the first local features.

Other example aspects of the present disclosure are directed to other systems, methods, vehicles, apparatuses, tangible non-transitory computer-readable media, and devices for generating data (e.g., scene representations, simulation data, training data, etc.), training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 5A depicts a block diagram of an example sensor packet processing system according to example implementations of the present disclosure;

FIG. 5B depicts an example comparison of the sensor data packet processing versus full sweep processing according to example implementations of the present disclosure;

DETAILED DESCRIPTION

Figure 1:
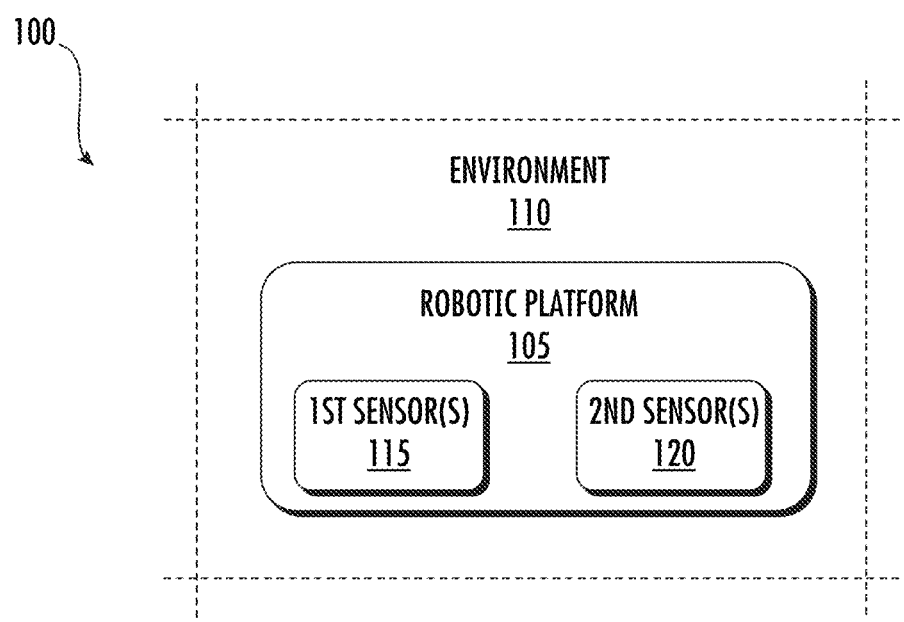
FIG. 1 depicts a block diagram of an example computing platform according to example implementations of the present disclosure.

Aspects of the present disclosure are directed to improving the ability of a robotic platform to perceive its surrounding environment and, ultimately, its ability to accuracy traverse its environment. For instance, a robotic platform, such as an autonomous vehicle, can include an onboard computing system that acquires three-dimensional point data corresponding to depth information (e.g., point cloud data captured through light detection and ranging (LIDAR) system(s), etc.). This sensor data can be acquired in sensor data packets that represent different portions of the surrounding environment (e.g., in thirty-six degree slices, etc.). The computing system can iteratively process the sensor data packets in a streaming fashion and continuously update a spatial map (e.g., stored in a multi-scale spatial memory, etc.) that keeps track of previously acquired packets. For example, the computing system can generate local feature maps for each sensor data packet representing a portion of the view (e.g., a three-hundred and sixty degree view) of a vehicle's environment as the packet is acquired. The computing system can iteratively update a spatial map to include the local features (e.g., object positional data, etc.) in each portion. This can include updating the spatial map to include local features determined by processing sensor data packets using machine-learned model(s). The computing system can utilize the spatial map, as it is updated with the local features, to detect an object (e.g., vehicle, pedestrian, etc.) within the surrounding environment, better plan its motion, etc. Ultimately, this can allow a robotic system to leverage past computation and make the incremental processing of incoming sensor data lightweight and efficient for improved autonomous functionality.

By way of example, a computing system of the robotic platform (e.g., autonomous vehicle, etc.) can obtain a first sensor data packet representing a first portion of a view (e.g., a three-hundred and sixty degree view) of a surrounding environment of an autonomous vehicle. The first sensor data packet can include point data generated with one or more LIDAR sensors and can be descriptive of a portion of the view (e.g., the thirty-six degree slice of three-dimension point cloud data, etc.). The computing system can generate a first local feature map based at least in part on the first sensor data packet. To do so, the computing system can be configured to generate a two-dimensional representation of the three-dimensional point cloud data using a machine-learned model and extract features from the two-dimensional representation to generate the first local feature map. The first local feature map can be indicative of one or more first local features associated with the first portion of the view (e.g., the three-hundred and sixty degree view) of the surrounding environment. The local features can include characteristics (e.g., positions, shapes, sizes, etc.) of objects (or portions thereof) appearing in the first portion of the view (e.g., the three-hundred and sixty degree view). The computing system can update a spatial map to include the first local features using machine-learned model(s), as further described herein. The spatial map can also include previously extracted local features associated with previous sensor data packet(s) representing different portion(s) of the view (e.g., the three-hundred and sixty degree view) of the surrounding environment than the first portion. The computing system can determine an object within the surrounding environment of the autonomous vehicle based at least in part on the spatial map including the first local features. For example, the computing system can identify the object's position, heading, etc. within the environment and classify the object as a vehicle, a pedestrian, a bicycle, or another type of object.

Aspects of the present disclosure can provide a number of technical improvements to robotic autonomous operations, computer vision technology, and simulation. For example, the machine-learned spatial map updating models described herein can leverage sensor data packets (e.g., three-dimensional data for a portion of a surrounding environment, etc.) to generate more timely updates to a robot's spatial memory descriptive of its surrounding environment. In this manner, the systems and methods of the present disclosure provide an improved approach for determining objects in a surrounding environment, thereby creating improved spatial data for robots, including autonomous vehicles, to navigate an environment. In some implementations, the data stored in the spatial map can be utilized for generating simulation data (e.g., simulation environments, etc.) or model training data. This can allow for more realistic offboard robotic simulation testing as well as improve model accuracy over time.

Furthermore, processing sensor data in packets instead of a full sweep can reduce latency issues and can be less computationally taxing. Algorithms that wait for the full sweep to be built before processing the data introduces an additional latency. As a consequence, the data no longer accurately reflects the state of the environment by the time an output is produced. Instead, the technology described herein can reduce latency and computational cost of updating spatial memory and object determination by processing sensor data in a streaming manner (e.g., as each sensor data packet becomes available, etc.). In this way, the systems and methods described herein can accumulate and utilize newly available information (e.g., sensor data packets, etc.) as it is captured to provide practical improvements to simulation, robotic, and vision technology.

Moreover, the machine-learned models described herein can learn to generate local feature maps by exploiting regional convolution and two-dimensional convolution modules. As a result, a computing system can voxelize the points of the sensor data and rasterize the data into a bird's eye view image, which can then be processed to define a minimal region that fully encloses all points. Two-dimensional convolutions can be employed on the rectangular region to extract a local feature map. This, in turn, improves the functioning of robotics and computer vision technologies by increasing the accuracy of a spatial map/spatial memory, which can include a plurality of local features that can be used for identifying objects in the surrounding environment. Thus, the systems and methods described herein, reduce memory usage and increase processing speeds for generating updated spatial maps by reducing the amount of sensor data processed at a given time. This ultimately allows for more timely environmental perception and more accurate motion planning for a robotic platform.

The following describes the technology of this disclosure within the context of an autonomous vehicle for example purposes only. As described herein, the technology described herein is not limited to an autonomous vehicle and can be implemented within other robotic and computing systems. For example, the systems and methods disclosed herein can be implemented in a variety of ways including, but not limited to, a computer-implemented method, an autonomous vehicle system, an autonomous vehicle control system, a robotic platform system, or a general robotic device control system.

With reference now to FIGS. 1-12, example implementations of the present disclosure will be discussed in further detail. FIG. 1 depicts a block diagram of an example operational scenario 100 according to example implementations of the present disclosure. The operational scenario 100 includes a robotic platform 105 and an environment 110. The environment 110 can be external to the robotic platform 105. The robotic platform 105, for example, can operate within the environment 110. The environment 110 can include an indoor environment (e.g., within one or more facilities, etc.) or an outdoor environment. An outdoor environment, for example, can include one or more areas in the outside world such as, for example, one or more rural areas (e.g., with one or more rural travel ways, etc.), one or more urban areas (e.g., with one or more city travel ways, etc.), one or more suburban areas (e.g., with one or more suburban travel ways, etc.), etc. An indoor environment, for example, can include environments enclosed by a structure such as a building (e.g., a service depot, manufacturing facility, etc.).

The robotic platform 105 can include one or more sensor(s) 115, 120. The one or more sensors 115, 120 can be configured to generate or store data descriptive of the environment 110 (e.g., one or more static or dynamic objects therein, etc.). The sensor(s) 115, 120 can include one or more LIDAR systems, one or more Radio Detection and Ranging (RADAR) systems, one or more cameras (e.g., visible spectrum cameras or infrared cameras, etc.), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LIDAR device, etc.).

The robotic platform 105 can include any type of platform configured to operate within the environment 110. For example, the robotic platform 105 can include one or more different type(s) of vehicle(s) configured to perceive and operate within the environment 110. The vehicles, for example, can include one or more autonomous vehicle(s) such as, for example, one or more autonomous trucks. By way of example, the robotic platform 105 can include an autonomous truck including an autonomous tractor coupled to a cargo trailer. In addition, or alternatively, the robotic platform 105 can include any other type of vehicle such as one or more aerial vehicles, ground-based vehicles, water-based vehicles, space-based vehicles, etc.

Figure 2:
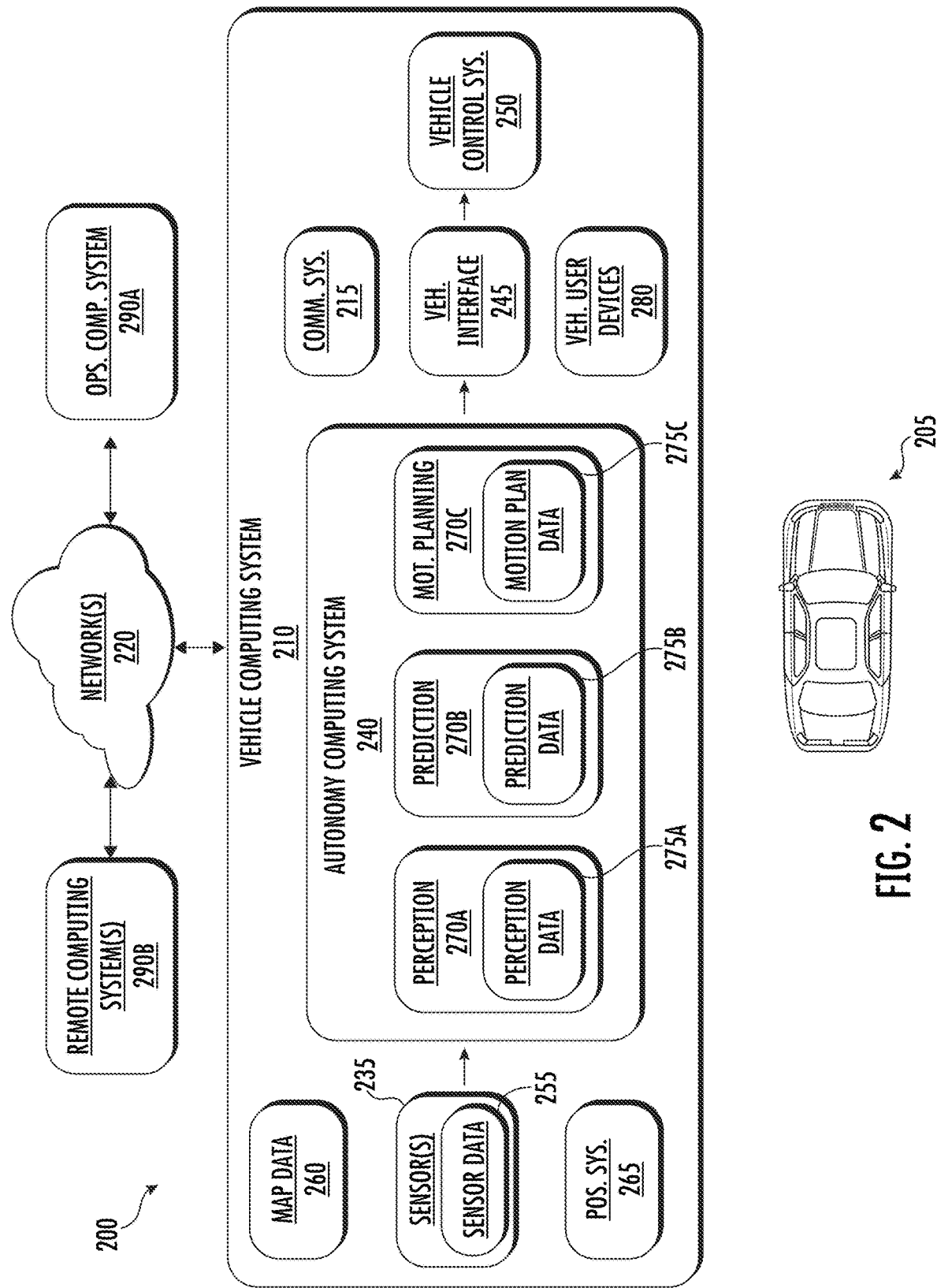
FIG. 2 depicts a block diagram of an example system according to example implementations of the present disclosure.

FIG. 2 depicts an example system overview 200 of the robotic platform as an autonomous vehicle according to example implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 205. For example, the vehicle computing system 210 can represent or be an autonomous vehicle control system configured to perform the operations and functions described herein. Generally, the vehicle computing system 210 can obtain sensor data 255 from a sensor system 235 (e.g., sensor(s) 115, 120 of FIG. 1, etc.) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1, etc.).

The vehicle 205 incorporating the vehicle computing system 200 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, etc.). The vehicle 205 can be a lightweight elective vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 (or also omitted from remote control of the vehicle 205). In some implementations, a human operator can be included in the vehicle 205.

The vehicle 205 can be configured to operate in a plurality of operating modes. The vehicle 205 can be configured to operate in a fully autonomous (e.g., self-driving, etc.) operating mode in which the vehicle 205 is controllable without user input (e.g., can drive and navigate with no input from a human operator present in the vehicle 205 or remote from the vehicle 205, etc.). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system (e.g., of a vehicle provider, fleet manager, or service entity associated with the vehicle 205, etc.) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input, etc.). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range, etc.). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users. This can include coordinating a vehicle service provided by the vehicle 205 (e.g., cargo delivery service, passenger transport, etc.). To do so, the operations computing system 290A can communicate with the one or more remote computing system(s) 290B or the vehicle 205 through one or more communications network(s) including the communications network(s) 220. The communications network(s) 220 can send or receive signals (e.g., electronic signals, etc.) or data (e.g., data from a computing device, etc.) and include any combination of various wired (e.g., twisted pair cable, etc.) or wireless communication mechanisms (e.g., cellular, wireless, satellite, microwave, and radio frequency, etc.) or any desired network topology (or topologies). For example, the communications network 220 can include a local area network (e.g., intranet, etc.), wide area network (e.g., the Internet, etc.), wireless LAN network (e.g., through Wi-Fi, etc.), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals, etc.) with one or more devices including the operations computing system 290A and the vehicle 205 through the communications network(s) 220.

The one or more remote computing system(s) 290B can include one or more computing devices such as, for example, one or more operator devices associated with one or more vehicle providers (e.g., providing vehicles for use by the service entity, etc.), user devices associated with one or more vehicle passengers, developer devices associated with one or more vehicle developers (e.g., a laptop/tablet computer configured to access computer software of the vehicle computing system 210, etc.), or other devices. One or more of the devices can receive input instructions from a user or exchange signals or data with an item or other computing device or computing system (e.g., the operations computing system 290A, etc.). Further, the one or more remote computing system(s) 290B can be used to determine or modify one or more states of the vehicle 205 including a location (e.g., a latitude and longitude, etc.), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the autonomous vehicle 205. For example, the computing device(s) can be located on or within the autonomous vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for collecting and processing sensor data in a streaming manner, performing autonomy functions, controlling the vehicle 205, communicating with other computing systems, etc.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers, etc.) that allow it to implement and utilize multiple-input, multiple-output (MIMO) technology and communication techniques. The vehicle computing system 210 can use the communications system 215 to communicate with one or more computing devices that are remote from the vehicle 205 over the communication network(s) 220 (e.g., through one or more wireless signal connections, etc.).

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN), etc.), on-board diagnostics connector (e.g., OBD-II, etc.), or a combination of wired or wireless communication links. The onboard systems can send or receive data, messages, signals, etc. amongst one another through the communication channel(s).

In some implementations, the sensor(s) 235 can include one or more LIDAR sensor(s). The sensor(s) 235 can be configured to generate point data descriptive of a portion of a three-hundred and sixty degree view of the surrounding environment of the robot. The point data can be three-dimensional LIDAR point cloud data. In some implementations, one or more sensors 235 for capturing depth information can be fixed to a rotational device in order to rotate the sensor(s) about an axis. The sensor(s) 235 can be rotated about the axis while capturing data in interval sector packets descriptive of different portions of a three-hundred and sixty degree view of a surrounding environment of the autonomous vehicle 205. In some implementations, one or more sensors 235 for capturing depth information can be solid state.

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LIDAR sensor, etc.). The at least two different types of sensor(s) can obtain multi-modal sensor data indicative of one or more static or dynamic objects within an environment of the autonomous vehicle 205.

The sensor(s) 235 can be configured to acquire sensor data 255. The sensor(s) 235 can be external sensors configured to acquire external sensor data. This can include sensor data associated with the surrounding environment of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more LIDAR systems, one or more RADAR systems, one or more cameras (e.g., visible spectrum cameras, infrared cameras, etc.), one or more motion sensors, one or more audio sensors (e.g., microphones, etc.), or other types of imaging capture devices or sensors. The sensor data 255 can include image data (e.g., 2D camera data, video data, etc.), RADAR data, LIDAR data (e.g., 3D point cloud data, etc.), audio data, or other types of data. The one or more sensors can be located on various parts of the vehicle 205 including a front side, rear side, left side, right side, top, or bottom of the vehicle 205. The vehicle 205 can also include other sensors configured to acquire data associated with the vehicle 205 itself. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, below the vehicle 205, etc. The sensor data 255 can be indicative of locations associated with the object(s) within the surrounding environment of the vehicle 205 at one or more times. The object(s) can be static objects (e.g., not in motion, etc.) or dynamic objects/actors (e.g., in motion or likely to be in motion, etc.) in the vehicle's environment. The sensor data 255 can also be indicative of the static background of the environment. The sensor(s) 235 can provide the sensor data 255 to the autonomy computing system 240, the remote computing device(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle was, is, or will be located. For example, the map data 260 can provide information regarding: the identity and location of different roadways, road segments, buildings, or other items or objects (e.g., lampposts, crosswalks or curb, etc.); the location and directions of traffic lanes (e.g., the location and direction of a parking lane, a turning lane, a bicycle lane, or other lanes within a particular roadway or other travel way or one or more boundary markings associated therewith, etc.); traffic control data (e.g., the location and instructions of signage, traffic lights, or other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high definition map data. In some implementations, the map data 260 can include sparse map data indicative of a limited number of environmental features (e.g., lane boundaries, etc.). In some implementations, the map data can be limited to geographic area(s) or operating domains in which the vehicle 205 (or autonomous vehicles generally) may travel (e.g., due to legal/regulatory constraints, autonomy capabilities, or other factors, etc.).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240, etc.) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270C, using a perception system, etc.) can process the sensor data 255, the map data 260, etc. to obtain perception data 275A. The vehicle computing system 210 can generate perception data 275A that is indicative of one or more states (e.g., current or past state(s), etc.) of one or more objects that are within a surrounding environment of the vehicle 205. For example, the perception data 275A for each object can describe (e.g., for a given time, time period, etc.) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the prediction function 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points. In some implementations, the prediction data 275B can be indicative of the speed or acceleration at which the respective object is predicted to travel along its associated predicted motion trajectory. The vehicle computing system 210 can utilize one or more algorithms or machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more way points (with associated coordinates). The way point(s) can be future locations for the vehicle 205. The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The motion planning function 270C can generate cost data associated with such trajectories. In some implementations, one or more of the predicted motion trajectories or perceived objects may not ultimately change the motion of the vehicle 205 (e.g., due to an overriding factor, etc.). In some implementations, the motion plan may define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C/motion plan(s) for the vehicle 205 (e.g., multiple times per second, etc.). Each new motion plan can describe a motion of the vehicle 205 over the next planning period (e.g., waypoints/locations(s) over the next several seconds, etc.). Moreover, a motion plan may include a planned vehicle motion trajectory. The motion trajectory can be indicative of the future planned location(s), waypoint(s), heading, velocity, acceleration, etc. In some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include the one or more vehicle user devices 280. For example, the vehicle computing system 210 can include one or more user devices with one or more display devices located onboard the vehicle 205. A display device (e.g., screen of a tablet, laptop, smartphone, etc.) can be viewable by a user of the vehicle 205 that is located in the front of the vehicle 205 (e.g., driver's seat, front passenger seat, etc.). Additionally, or alternatively, a display device can be viewable by a user of the vehicle 205 that is located in the rear of the vehicle 205 (e.g., a back passenger seat, etc.). The user device(s) associated with the display devices can be any type of user device such as, for example, a tablet, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system over training data stored in a training database. The training data can include, for example, sequential sensor data indicative of an environment (and objects/features within) at different time steps. In some implementations, the training data can include a plurality of environments previously recorded by the autonomous vehicle with one or more objects, static object(s) or dynamic object(s).

To help improve the performance of a robotic platform, such as an autonomous vehicle of FIG. 2, the technology of present disclosure can leverage sensor data packet processing to generate updated spatial data of a surrounding environment. Using the technology of the present disclosure, a sensor data packet can be processed to generate a two-dimensional representation, which can be processed to generate a local feature map which is then used to update a spatial map for object determination, or detection.

Figure 3:
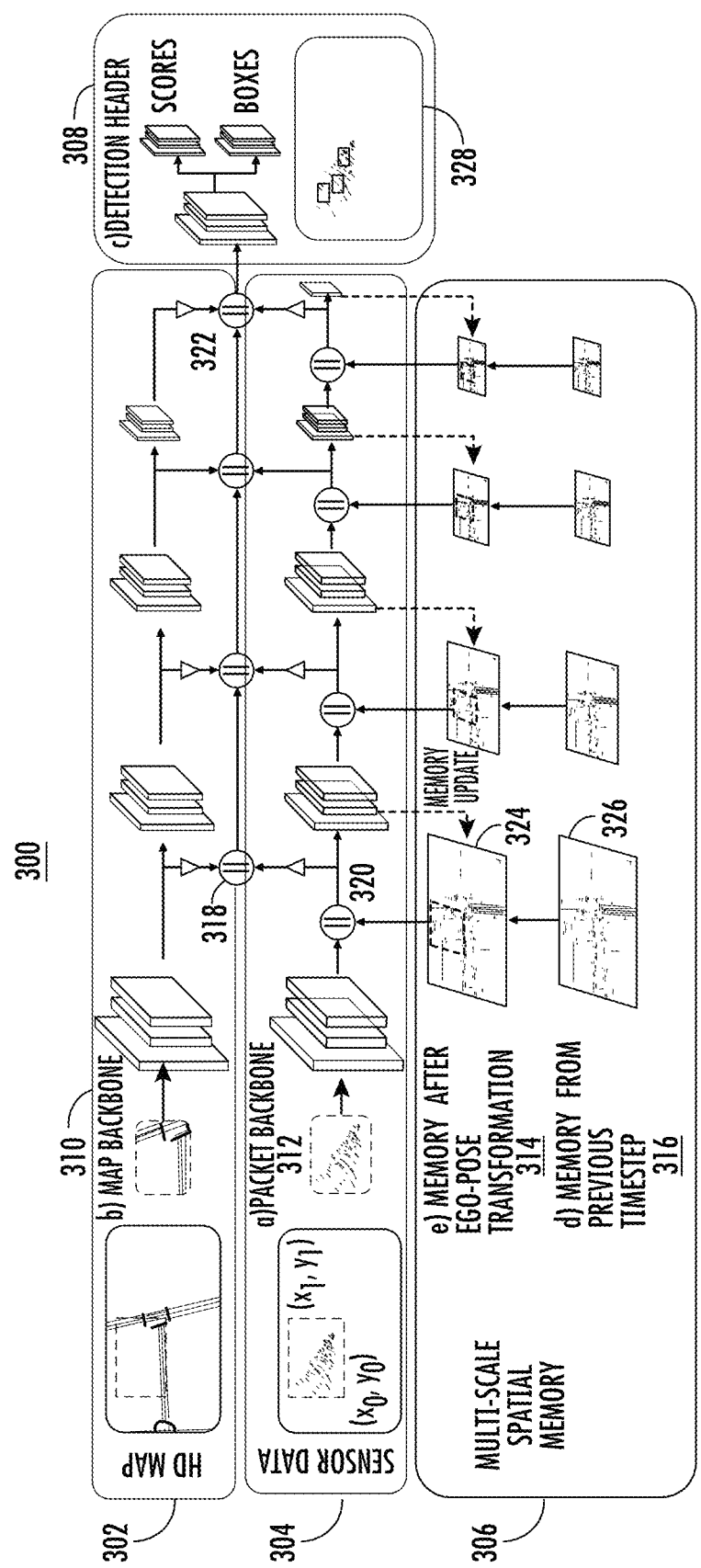
FIG. 3 depicts an example sensor data packet processing architecture according to example implementations of the present disclosure.

For example, FIG. 3 depicts an example system 300 configured to update a spatial map and determine object(s) in a surrounding environment according to example implementations of the present disclosure. As further described herein, the spatial map can be indicative of at least a portion of an environment in which a robotic platform operates. The system 300 can include any of the system(s) (e.g., robotic platform 105, autonomous vehicle 205, vehicle computing system 210, remote computing system 290B, operations computing system 290A, etc.) described herein such as, for example, with reference to FIGS. 1, 2, etc. The system 300 can be configured to process a sensor data packet to generate a local feature map to update a spatial map and determine one or more objects in the surrounding environment.

To do so, the system 300 can obtain sensor data 304. In some implementations, the sensor data 304 can include a plurality of sensor data packets. A sensor data packet can be indicative of a portion of a three-hundred and sixty degree view of an environment of the computing system 300 such as, for example, the system 300, an autonomous vehicle (e.g., vehicle 205, etc.), a robotic platform (e.g., platform 105, etc.), or any other system (or combination thereof) configured to obtain sensor information associated with a real world environment.

The sensor data 304 can include three-dimensional data (e.g., LIDAR data, etc.) associated with one or more real world environments. For example, the sensor data 304 can be collected or generated in sensor data packets in which each sensor data packet is descriptive of a different portion of the surrounding environment. The sensor data packets can include a plurality of point data sets depicting the at least one environment from different perspective(s). By way of example, the sensor data packets can include three-dimensional point cloud data captured through one or more LIDAR sensors. In some implementations, each of the plurality of sensor data packets can be associated with a different portion of an environment.

The sensor data 304 can include depth data. The depth data can include positional information for one or more objects (e.g., static, background, dynamic, etc.) within a field of view of one or more sensors (e.g., LIDAR sensors, RADAR sensors, etc.). For example, the depth data can include a three-dimensional point cloud data (e.g., a LIDAR point cloud, etc.) indicative of a relative position of the one or more features within an environment. In some implementations, the depth data and obtained HD map data 302 can be fused to generate a representation (e.g., three-dimensional pixels, two-dimensional bird's eye view, etc.) of an environment.

In some implementations, the sensor data 304 can be generated with one or more rolling shutter LIDAR sensors. LIDAR data can be generated, or obtained, in sensor data packets. The systems and methods disclosed herein can minimize latency by ingesting packets of LIDAR data and emitting a stream of detections without waiting for the full sweep to be built. Additionally, or alternatively, the system 300 can utilize sensor data packets including image data (e.g., generated, or obtained, in frames, etc.) or RADAR data. The system 300 can reuse computations from previous points and can iteratively update the spatial memory 306 of the scene as new sensor data comes in, resulting in latency reduced accurate perception. For safer and more accurate spatial memory 306, the system 300 can process the sensor data packets individually to provide spatial map updates after each packet is obtained; therefore, providing updates for the spatial map (stored in the spatial memory 306) in portions instead of full sweeps.

The system 300 can further leverage previous computations in combination with the updated data to provide up-to-date object detection. For example, the system 300 can leverage a detection model 308 which exploits the sequential nature of sensor observation and efficiently reuses past computation to stream low latency object detections from sensor data packets (e.g., LIDAR packets, etc.). Additionally or alternatively, the system 300 can voxelize an incoming sensor data packet into a bird's eye view (BEV) grid and can use an efficient convolutional backbone 312 to process only the relevant region. Furthermore, the system 300 can utilize a spatial memory 306 (e.g., from a multi-scale memory, etc.) that is read and updated with each sensor data packet. In some implementations, the system 300 can reuse past computations, and can make the incremental processing of incoming sensor data packets lightweight and efficient. In particular, in some implementations, the system 300 can treat sensor data 304 (e.g., LIDAR data, etc.) as a continuous stream of points to update spatial memory 306 in a continuous sweep.

The system 300 disclosed herein can utilize a low latency object detector that emits detections from streaming sensor observations. For example, as a rotating LIDAR sensor spins, the LIDAR sensor can generate sensor data (e.g., point data, etc.) 304 in senor data packets (e.g., sector packets with each packet roughly spanning 36°, etc.). The system can process the sensor data 304 at the packet level. Therefore, the system 300 can avoid the data preprocessing latency of full sweep processing (e.g., by up to 0.1 s, etc.). To leverage previous iterations of processed sensor data packets, the system 300 can include the spatial memory 306 to reuse past computation and make incremental processing (e.g., of incoming sensor data packets, etc.) lightweight and efficient.

By way of example, the system 300 can obtain a first sensor data packet representing a first portion of a three-hundred and sixty degree view of a surrounding environment. The surrounding environment can be a surrounding environment for a robotic system (e.g., an autonomous vehicle). In some implementations, the first portion can be associated with a degree slice of the three-hundred and sixty degree view, and the degree slice can be between thirty degrees and forty-five degrees (e.g., thirty-six degrees, etc.). The first sensor data packet can include three-dimensional point cloud data 304 generated with one or more LIDAR sensors. In some implementations, the one or more LIDAR sensors can be rotated to generate sensor data packets for each respective portion of the three-hundred and sixty degree view. Observations from a rotating LIDAR sensor can form an unstructured stream of 4D points (x, y, z, t) that arrive in the sensor data packets. As described herein, the system 300 can process the sensor data 304 at the packet level to reduce both latency preprocessing and model inference to significantly reduce the time between observation and detection.

Moreover, the system 300 can generate a first local feature map based at least in part on the first sensor data packet. The first local feature map can be generated using one or more first machine-learned models. The first local feature map can be indicative of one or more first local features associated with the first portion of the three-hundred and sixty degree view of the surrounding environment. Generating the first local feature map can include generating a two-dimensional representation associated with the first portion of the three-hundred and sixty degree view of the surrounding environment of the autonomous vehicle, or robotic system. Additionally or alternatively, the one or more machine-learned models can be trained to: process the first sensor data packet to generate a two-dimensional representation of the three-hundred and sixty degree view and can be trained to perform two-dimensional convolutions on the two-dimensional representation to generate the first local feature map. The first local features can include, for example, positional data associated with the object in the first portion of the three-hundred and sixty degree view of the surrounding environment of the autonomous vehicle.

To avoid the latency while leveraging the proven strength of BEV representations and 2D convolutions, the system 300 can process each sensor data packet with a regional convolution. In some implementations, for each sensor data packet, the system 300 can first voxelize the points and can rasterize into a BEV image x with height as the channel dimension. The system 300 can then determine coordinates $x_0$, $x_1$, $y_0$ and $y_1$ which define the minimal region that fully encloses all points (e.g., in the sensor data packet, etc.). Then, 2D convolutions can be employed to extract a local feature map $y_{region}$ only on the defined rectangular region, thus leveraging locality to minimize wasted computation.

$$y_{region} = f_{region}(x_{x_0:x_1,y_0:y_1}, w_{filter}).$$

In practice, $f_{region}$ can be a cross correlation (2D convolution) operator between the filter weights and input.

The system 300 can first apply the regional convolution for packet-level processing to the new input sensor data packet as well as the current state of the spatial memory 306. The processing can yield several feature maps at different resolutions (e.g., downsampled by a factor of 2, 4, 8 and 16 with respect to the input, etc.), which the system 300 can then interpolate to a common scale (e.g., of 1.6 meters/pixel, etc.) and can finally concatenate along the feature dimension 320.

In addition to sensory information, the system 300 can leverage high-definition (HD) maps 302, which can be useful as a prior over an object's location (e.g., a vehicle can be more likely to be on the road than on the sidewalk, etc.). The system 300 can rasterize the map in BEV and can apply a convolutional backbone network 310 to extract features at the same resolution as the output feature map from the streaming branch (e.g., of packet backbone 312, etc.). In some implementations, the system 300 may only need to extract features for the relevant crop of the map of each sensor data packet.

Additionally or alternatively, the system 300 can then fuse the map features with the sensor data packet streaming features via concatenation 318 and 322 and a subsequent convolutional header. The system 300 can then apply a single-stage detection header 308 consisting of a plurality of convolutional layers (e.g., two layers, etc.) that predict the classification and regression targets for each anchor pixel in the fused feature map.

As depicted in FIG. 3, the first local feature map can be used to update a spatial map 324 to include the first local features. The spatial map can include previously extracted local features 316 (e.g., shown in a previous iteration 326 of the spatial map, etc.) associated with a previous sensor data packet representing a different portion of the three-hundred and sixty degree view of the surrounding environment than the first portion. In some implementations, the spatial map 324 can be descriptive of past local feature maps generated by processing previously obtained sensor data packets. Additionally or alternatively, updating the spatial map 324 can include processing the first local feature map with one or more second machine-learned models. The one or more second machine-learned models can be configured to interpolate the first local feature map to a scale and perform feature-wise concatenation of the first local feature map and the spatial map to update the spatial map based at least in part on the first sensor data packet.

In some implementations, updating the spatial map 324 can include obtaining previous computations descriptive of past computations for previous sensor data packets and updating spatial memory based on the previous sensor data packets and the first local feature map to update the spatial map. Additionally or alternatively, updating the spatial map 324 can include replacing one or more previous computations of the spatial map with the one or more first local features.

In some implementations, regional convolutions can allow the system 300 to process packets individually. Independently processing the packets can cause objects to be fragmented across many packets. Furthermore, a single observation of an object far away can typically yield few points due to the sparsity of the sensor at range.

To account for the fragmentation, the system 300 can involve iteratively building the spatial memory 306 (e.g., the stored spatial map 324, etc.), from a series of partial observations while at the same time producing new detections with minimal latency, as defined by the difference between the observation time of an object and the emission of a detection. Therefore, the system 300 can re-use past computations and produce low-latency and accurate detections.

In some implementations, a different memory block can be employed at each resolution level, which can keep track of the features extracted by the corresponding convolutional blocks through time. In particular, the spatial memory 306 can be incrementally updated with new local features such that the spatial memory 306, including the spatial map 324, can always reflect the latest state of that region according to the last time the region was observed. Furthermore, the spatial map 324 can be kept synchronized with the ego-pose 314 by bilinearly resampling of the features according to the rigid transformation defined by the three degrees of freedom (x, y, θ) displacement between two consecutive poses. This can help maintain all features and detections on the same coordinate frame. Each update step can be done through aggregation of the current memory state $y_{memory}$ and the incoming local features. Specifically, the system 300 can employ a channel reduction with learned parameters w as follows:

$$y'_{memory_{x_0:x_1,y_0:y_1}} = f_{memory}(y_{memory_{x_0:x_1,y_0:y_1}}, y_{region}, w).$$

In practice, $$y_{memory_{x_0:x_1,y_0:y_1}}$$

and $y_{region}$ can be first concatenated 320 along the channel dimension, then $f_{region}$ can compute the cross correlation with the filter weights w.

The sequence of local convolutions and aggregations with a rolling memory map can be used to define a layer block in the network. For example, a sequence of four (4) (with pixel resolutions of 0.2 m, 0.4 m, 0.8 m and 1.6 m, respectively) can be employed, then outputs can be regressed from the aggregation of the multi-resolution features. The benefits of this approach can be twofold: the approach can allow the model to regress low latency detections from partial observations by remembering the immediately preceding packets while also making it possible for the network to persist longer term features, which can be useful to detect objects through occlusion over multiple sweeps.

The system 300 can determine an object is within the surrounding environment of the corresponding robotic platform (e.g., autonomous vehicle, etc.). The determination can be based at least in part on the spatial map 324 including the first local features. Determining the object can include obtaining map data 302 and fusing the map data 302 with the spatial map 324. Additionally or alternatively, determining the object is within the surrounding area can include processing the spatial map 324 with one or more classification models to generate a classification 328 for the one or more first local features. Additionally, or alternatively, a bound shape (e.g., a bounding box, etc.) associated with the object can be generated. In some implementations, the object may be partially occluded from a field of view of a sensor of the autonomous vehicle, or robotic system.

Objects can be defined via their centroid ($b_x$, $b_y$) and confidence $\sigma$. By way of example, vehicles can have length and width in BEV (l, w). For the confidence, the system 300 can predict the object's log it $$\log \frac{\sigma}{1-\sigma}.$$

Alternatively or additionally, the system 300 can define the centroid of the box ($b_x$, $b_y$) as an offset ($\Delta x$, $\Delta y$) from the coordinates of the center point of its anchor pixel ($a_x$, $a_y$)

$$(b_x, b_y) = (a_x + \Delta x, a_y + \Delta y).$$

For the vehicle dimensions, additional outputs can be utilized to predict [log l, log w], which encourages the network to learn a prior on the dimension of the shapes (e.g., low variance should be expected from the dimension of vehicles, etc.). The heading $b_\phi$ can be parameterized by the tangent value, in particular, the system 300 can predict a ratio such that the specific quadrant can be retrieved:

$$b_\phi = \arctan \frac{\theta_1}{\theta_2}.$$

The system 300 can repeat the process for each portion of the three-hundred and sixty degree view of the surrounding environment. For example, the system 300 can obtain a second sensor data packet representing a second portion of the three-hundred and sixty degree view of the surrounding environment of the robotic system (e.g., the autonomous vehicle, etc.). The first sensor data packet can be obtained in a streaming manner at a first time when the first sensor data packet is acquired through a sensor system, and the second sensor data packet can be obtained in the streaming manner at a second time when the second sensor data packet is acquired through the sensor system, after the first sensor data packet.

The one or more first machine-learned models (e.g., trained for local feature map generation, etc.) can then generate a second local feature map based at least in part on the second sensor data packet. The second local feature map can be indicative of one or more second local features associated with the second portion of the three-hundred and sixty degree view of the surrounding environment. The second local feature map can be generated after the first local feature map is generated.

The second local feature map can then be used to update the spatial map 324 to include the one or more second local features. Therefore, the updated spatial map can be updated to include the one or more second local features after being updated to include the one or more first local features.

The spatial map 324 with the first local features and the second local features can then be used to determine a second object within the surrounding environment of the autonomous vehicle, or robotic system. Additionally, or alternatively, the spatial map 324 with the first local features and the second local features can then be used to determine updated characteristics of a previously determined object (e.g., a new position of the object, etc.).

Figure 11:
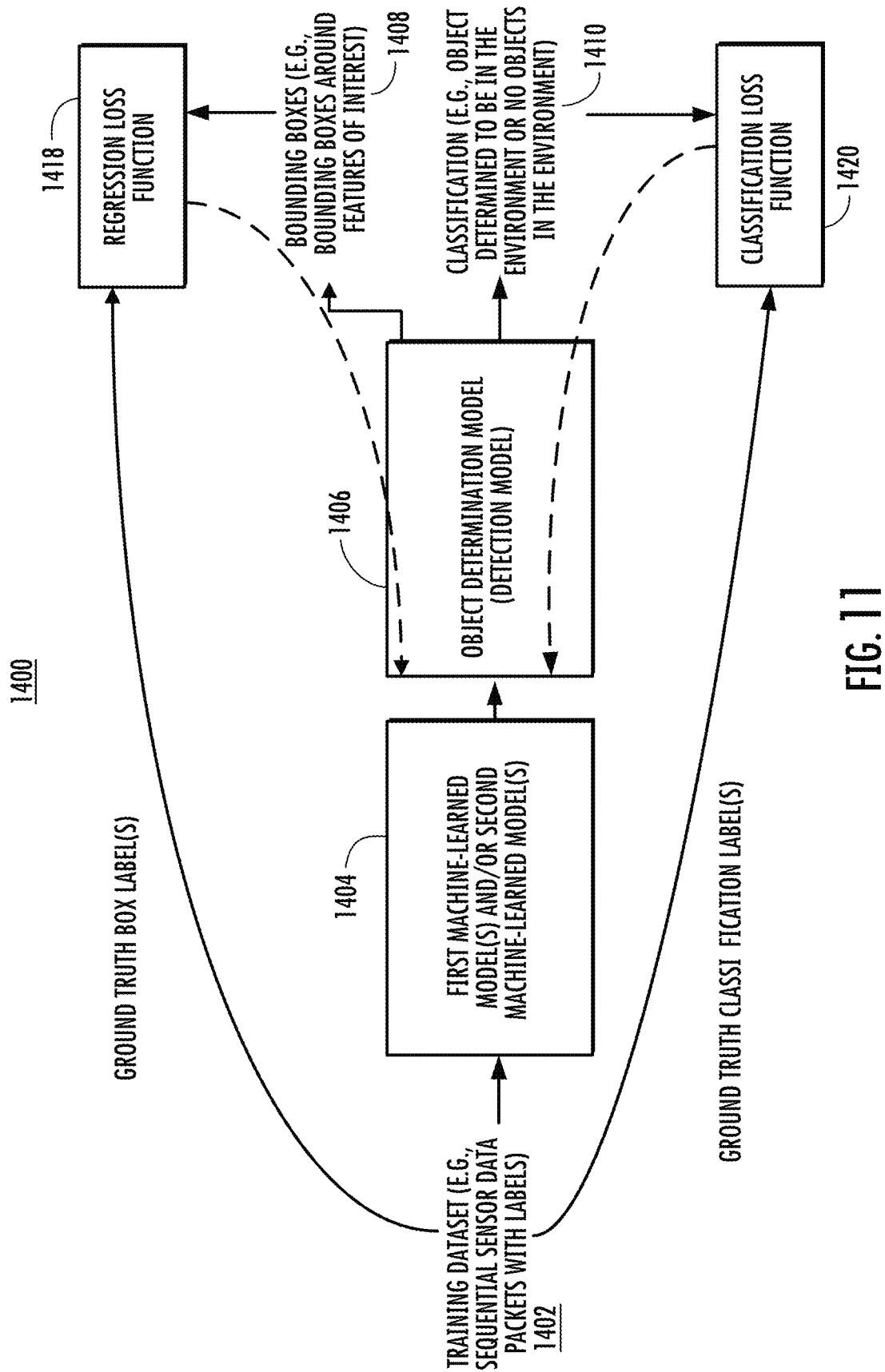
FIG. 11 depicts a block diagram of an example process for training one or more machine-learned models for sensor data packet processing according to aspects of the present disclosure.
Figure 12:
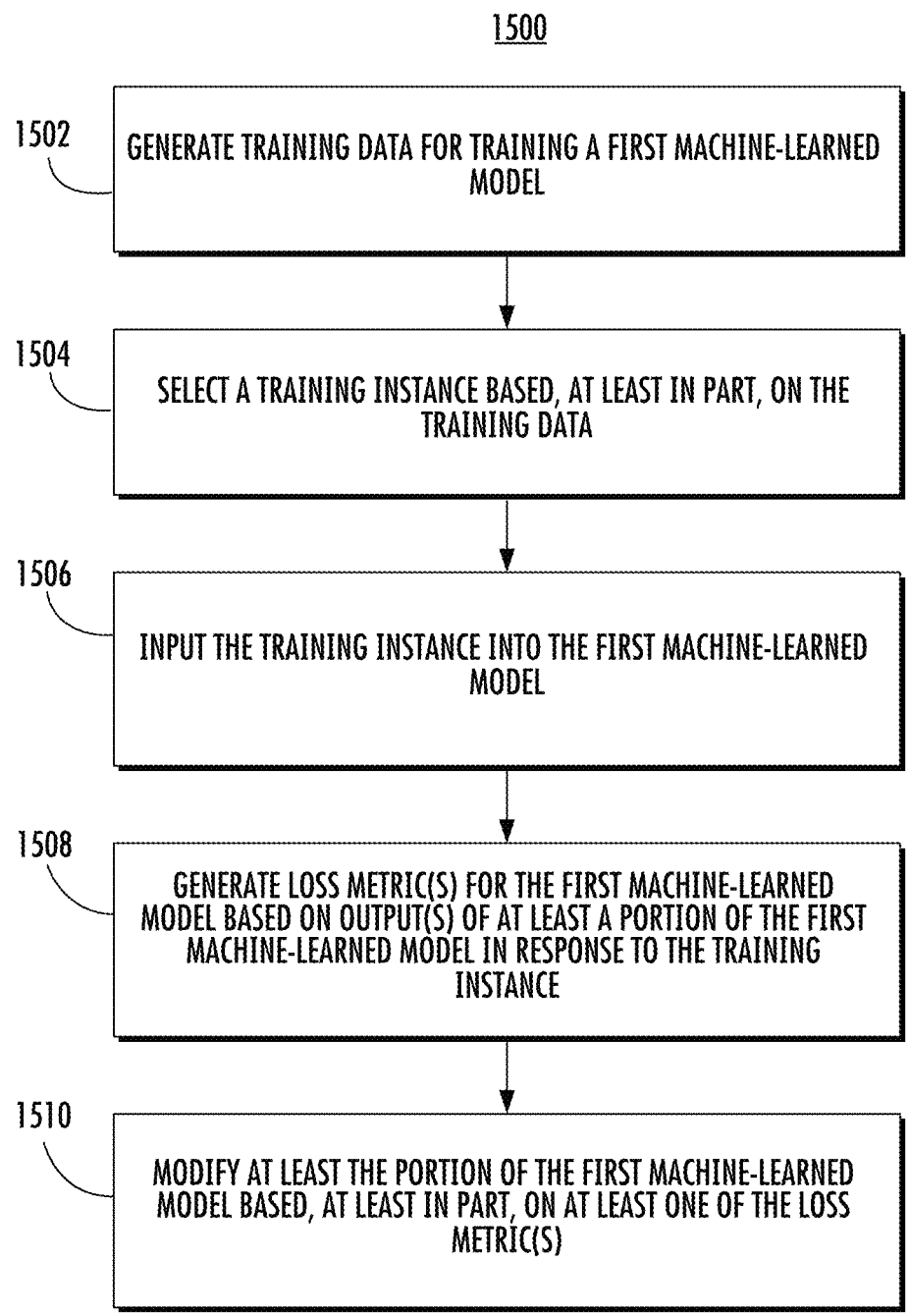
FIG. 12 depicts a flowchart of an example method for training an example machine-learned model according to aspects of the present disclosure.

As further described herein with reference to FIGS. 11 and 12, various training techniques can be utilized for the machine-learned model(s) employed in system 300. For example, the one or more machine-learned models of system 300 can be trained sequentially with a plurality of training data sets and using backpropagation. Each training data set can represent training packets at sequential time steps. In some implementations, training for object determination can involve employing a multi-task loss over classification and bounding box regression to optimize the model with a $\alpha$ ratio of 2.0 ($\mathcal{L} = \mathcal{L}_{reg} + \alpha \mathcal{L}_{cls}$).

Regression can be denoted as $\mathcal{L}_{reg}$. Moreover, $\mathcal{L}_{reg}$ can be defined as the weighted sum of the smooth L1 loss between the predicted box parameters and the ground truth. For example, $$\mathcal{L}_{reg}(y, \hat{y}) = \frac{1}{N} \sum_{i=0}^{N} \sum_{d \in (x,y,\log w, \log l, \theta_1, \theta_2)} \gamma_d \times \text{smooth}_{L1}(y_d^i - \hat{y}_d^i)$$

$$\text{smooth}_{L1}(x) = \begin{cases} 0.5x^2 & \text{if } |x| \leq 1 \\ |x| - 0.5 & \text{otherwise} \end{cases}.$$

The system 300 (or a separate training system) can include $\gamma$ values of 1.0 for x, y, log w, log l, and 2.0 for $\theta_1$, $\theta_2$ can be used. In some implementations, for pedestrians the log w, log l, $\theta_1$, and $\theta_2$ can be omitted as the system 300 may only be concerned with predicting the centroid (x and y). $\mathcal{L}_{cls}$ can be the binary cross entropy between the predicted scores and the ground truth.

If there is a severe class imbalance between positive and negative anchors given that most pixels in the BEV scene do not contain an object, the system 300 can employ hard negative mining. Thus, the loss can become $$\mathcal{L}_{cls}(y, \hat{y}) = \frac{1}{N} \sum_{i=0}^{N} \hat{y}_{pos}^i + \frac{1}{K} \sum_{i=0}^{N} \mathbb{1}[i \in N_K](1 - \hat{y}_{neg}^i) \log(1 - y),$$

where K can be a set containing K hard negative anchors. The set can be obtained by, for example, first randomly sampling a plurality of anchors for vehicles (e.g., 750 anchors, etc.), for cyclists (e.g., 1500 anchors, etc.), and for pedestrians (e.g., 1500 anchors, etc.), and then picking a certain subset (e.g., 20, etc.) with a highest loss for each class.

Due to the sequential nature of the spatial memory 306, the one or more machine-learned models can be trained sequentially through examples that contain a plurality of packets (e.g., 50 packets each corresponding to 0.5 s, etc.), such that backpropagation through time can be used to compute gradients across the memory. Furthermore, the model(s) can be trained to remember by supervising the model(s) on objects with zero (0) points as long as the object was seen in any of the previous packets. In practice, due to GPU memory constraints, the system may only compute the forward pass in a first subset of packets (e.g., 40, etc.) to warm-up the memory, then forward and backward through time in the remaining packets (e.g., the last 10, etc.).

The one or more machine-learned models can be evaluated with or trained on a challenging large scale autonomous driving dataset that consists of a plurality of snippets with diverse conditions (e.g., 6500 snippets with various geographical characteristics, lighting, road topology, vehicle types, etc.). For example, the system 300 can particularly focus on the sensor data (e.g., LIDAR data, etc.), which rotates (e.g., at a rate of 10 hz, etc.) and can emit new sensor data packets (e.g., at 100 hz, etc.)—each roughly covering a 36° region (e.g., for a total of 16,250,000 packets in the dataset, etc.). Furthermore, an accurate ego-pose can also be available for each sensor data packet, thus allowing the system 300 to compensate for ego-motion and accurately determine the geometrical relationship between packets. Labels can provide both the spatial extents and motion model of objects, from which the system can extract accurate bounding shapes (e.g., boxes, etc.) both at the discrete times of observation and in continuous time through interpolation of the motion model. If the observation of an instance is split across packets, each one may have an instance of the label according to the pose of itself and the ego-robot at the timestamp of the sensor data packet.

The system 300 can be evaluated against the baselines in two settings using mean average precision (mAP) as a metric. In addition to the standard labels of our dataset, the system 300 can be evaluated with latency-aware labels that take into account the delay introduced by aggregating consecutive packets (Latency mAP). To match detection and labels, the training or evaluation can involve the use of IOU thresholds (e.g., of [0.5, 0.5] for vehicles and cyclists, etc.), and L2 distance to centroid (e.g., for pedestrians with [0.5 m, 0.3 m], etc.) in both settings. Furthermore, the model(s) can be trained and evaluated in a per-packet setting as well as a full sweep setting.

To rectify the lack of latency awareness in the standard full sweep object detection setting, the system 300 can introduce a latency-aware mAP metric. For the metric, the training or evaluation can involve re-defining the detection label for each object in the scene as the object's state at detection time, rather than observation time. The benefits of this metric can be twofold: (1) the metric can evaluate how well the detector models the state of the real world and the quality of the data that is used by downstream motion planning tasks, and (2) the metric can allow for a direct comparison with standard detection metrics, thus making apparent the effects of latency. In some implementations, the one or more machine-learned models can be trained on full sweep data or partial sweep data sets.

The system 300 can include point data streaming with a focus on perception. The system 300 can produce highly accurate objects at very low latency by using regional convolutions over individual sensor packets alongside a spatial memory 306 (e.g., storing a spatial map 324, etc.) that keeps track of previous observations. Moreover, the system 300 can include a new latency aware metric that quantifies the cost of data buffering, and how that affects the output quality for the downstream tasks. In some implementations, the system 300 can further include the use of the memory module for long term tracking through occlusion and motion forecasting.

FIG. 3 also depicts an example architecture system 300 for streaming object detection from sensor data packets. In particular, the example system 300 can leverage a packet backbone 312, a map backbone 310, a detection header 308, memory from previous timestep 316, and memory after ego-pose transformation 314 for object detection in an environment.

The system 300 can obtain sensor data 304 (e.g., 3D point cloud data generated with one or more LIDAR sensors, etc.). The sensor data 304 can be processed as sensor data packets with the packet backbone 312. The sensor data packets can be descriptive of a portion of the surrounding environment, as described herein.

The packet backbone 312 can include one or more convolutional layers and can include one or more concatenations. The packet backbone 312 can be used to process the sensor data packet by voxelizing and rasterizing the packets to generate a two-dimensional representation of the sensor data packet (e.g., a BEV image with different channel dimensions, etc.). This can be a minimal region that fully encompasses all points can be determined. Two-dimensional convolutions can be employed on the representation to generate a local feature map. The local feature map and a pre-existing spatial map 326 can be concatenated 320 to update the spatial map 324 to include the one or more local features from the local feature map. As described herein, the local features can include features from the respective portion of the three-hundred sixty degree view of the environment. This can include, for example, positional data or other characteristics of objects within that portion. The process can be repeated for each sensor data packet obtained.

The spatial map 324 can be obtained from the spatial memory 306. The spatial memory 306 can include memory from previous timestep 316 and memory after ego-pose transformation 314. The memory from previous timestep 316 can be used to generate the memory after ego-pose transformation 314 (e.g., into a certain frame of reference, etc.). Moreover, the memory from previous timestep 316 and the memory after ego-pose transformation 314 may be utilized for generating an updated spatial map 324. The previous computations paired with local feature map can provide for accurate and up-to-date spatial map generation and updating, which can be used for object detection.

As described herein, in some implementations, the system 300 can obtain one or more HD maps 302 of the surrounding environment. The maps 302 can be processed with the map backbone 310. The map backbone 310 can include one or more convolutional layers for extracting features to generate map-based feature maps. The map-based feature map can be interpolated and concatenated with the interpolated local feature map, for example at 318, 322.

The resulting output can be an HD map-aware spatial map that can be processed with the detection header 308 to determine one or more objects are in the surrounding environment. The classification 328 can then be utilized to determine one or more actions for a robotic platform. For example, the course or route of a robot (e.g., an autonomous vehicle 205, etc.) can be altered based on the detection of an object.

Additionally, or alternatively, the output of system 300 can be utilized to generate simulation data for testing a robotic platform. For example, the output of the detection header 308 indicating object positions, bounding shapes, or other characteristics within the surrounding environment can be used to generated a simulated environment that includes simulated objects. The simulate environment can be reflective of the features of the surrounding environment of the robotic platform utilizing system 300. The simulated objects can include one or more of the same or similar characteristics as the objects determined by the system 300 using the technology of the present disclosure. The simulation data can be indicative of the simulated objects within the simulated environment and can be utilized to test the performance of a simulated robotic platform (e.g., an autonomous vehicle, etc.) as it traverses the simulated environment. The generation of the simulated data and running of the simulation testing can be performed by a computing system that is remote from system 300.

Figure 4:
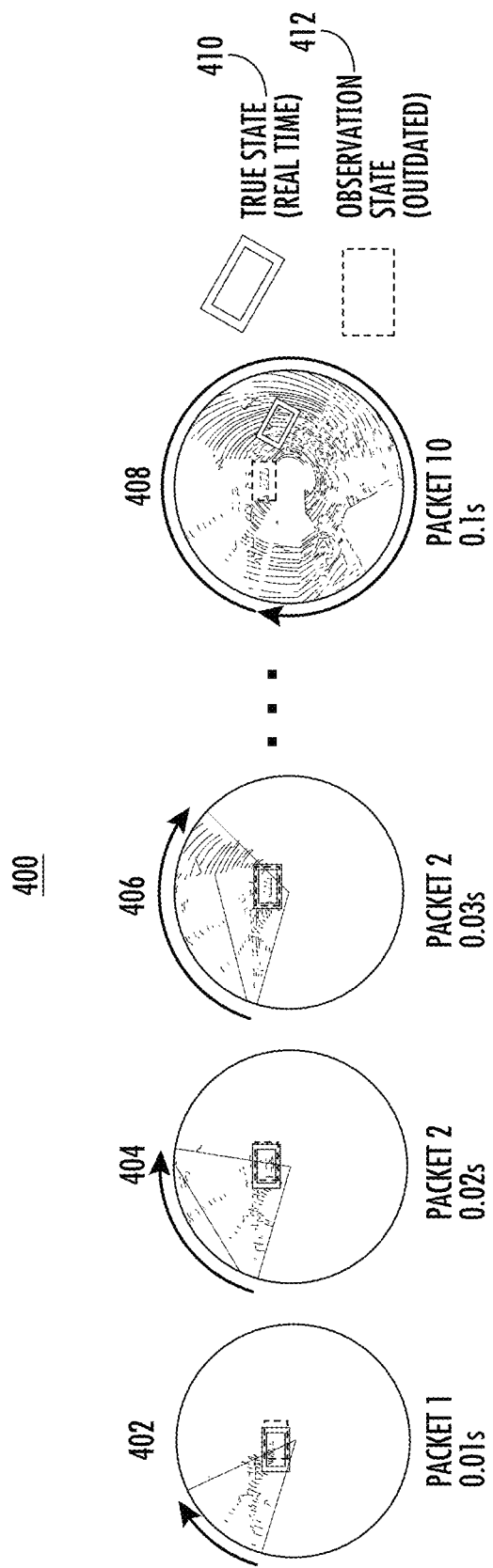
FIG. 4 depicts example updates according to example implementations of the present disclosure.

FIG. 4 conveys the latency caused by processing sensor data 304 in a full sweep instead of as packets in streaming manner. For example, FIG. 4 depicts an example series of sensor data packets 400 generated with one or more sensors 115 or 120. Each example packet is denoted with a true state 410 of an object and an observation state 412 of an object. The true state 410 can be the real-time location of an object, and the observation state 412 can be the location of the object at the time of the last full sweep of packets processed. At the time of the first packet 402 the object is in a slightly different location than previously observed in the previous sweep. Similarly, the second packet 404 and third packet 406 can be observed at a subsequent times. At the time the third packet 406 is observed, the determined object location from the previous sweep 412 and the true state 410 are overlapping. However, as more time passes, the observations from the previous sweep become more and more outdated. At the time of the last packet in the sweep 408, the true state 410 and observation state 412 differ greatly, as shown in FIG. 4. Therefore, processing techniques that wait for the full sweep can cause outdated information to be continuously used until another full sweep is processed.

Rather than waiting for a full sweep, the systems and methods disclosed herein can process each of the sensor data packets individually as they are acquired in order to provide more timely and up-to-date data with lessened latency. As described herein, the system 300 can utilize the one or more machine-learned models to process sensor data packets individually instead of in full sweeps. For example, FIG. 5A depicts an example time series for sensor data packet processing system 500 according to example implementations of the present disclosure. The sensor data packet processing system 500 can include a plurality of sensor data packets 504 for a plurality of times 502. The sensor data packets 504 can be processed individually with one or more machine-learned models in order to update a spatial map 506 based on the respective sensor data packet 504. The updated spatial map 506 can then be utilized to generate updated object detection data 508.

For example, a first sensor data packet can be associated with a first time 510 and a first portion of an environment, a second sensor data packet can be associated with a second time 512 and a second portion of the environment, and the nth sensor data packet can be associated with an nth time 514 and an nth portion of the environment. The sensor data packets 504 can be processed separately, and in a streaming manner, to provide for lessened computational costs and may each be used to generate respective local feature maps for their respective portions of the environment, as described herein. This can include the use of one or more first machine-learned models 516 that are trained to extract the local features and generate local feature maps for a respective sensor data packet 504, as each sensor data packet is captured and provided for processing, for example, prior to the next sensor data packet.

The local feature maps can then be used to generate updated spatial maps 506 that leverage the new data and previous data to provide updated representations of the environment. The spatial maps 506 or the local feature maps and the previous data may be processed with a classification model (e.g., of detection header 308, etc.) to determine one or more objects as indicated in the object detection data 508 (e.g., a series of detections, each respectively associated with a portion of the environment, etc.).

FIG. 5B depicts an example comparison of a full sweep processing system 530 versus the packet processing system 520. As depicted in FIG. 5A and FIG. 5B, the packet processing systems 500, 520 can intake sensor data as streaming packets, process the packets, and provide outputs for each portion of the environment described by each respective packets. Previous data and new outputs derived from the sensor data packets can then be utilized together to generate updated detection outputs. Alternatively, the full sweep processing system 530 only produces an output after a full sweep of sensor data is completed, and the full sweep of sensor data is processed together. Processing for the full sweep can be computationally expensive. The resulting output of the full sweep detection can be outdated almost immediately as the next sensor data packet may be obtained during the longer computational time of processing a full sweep. Therefore, the packet processing system 520 can provide more frequent updates, require less computational power, and generate more accurate detections.

Figure 6:
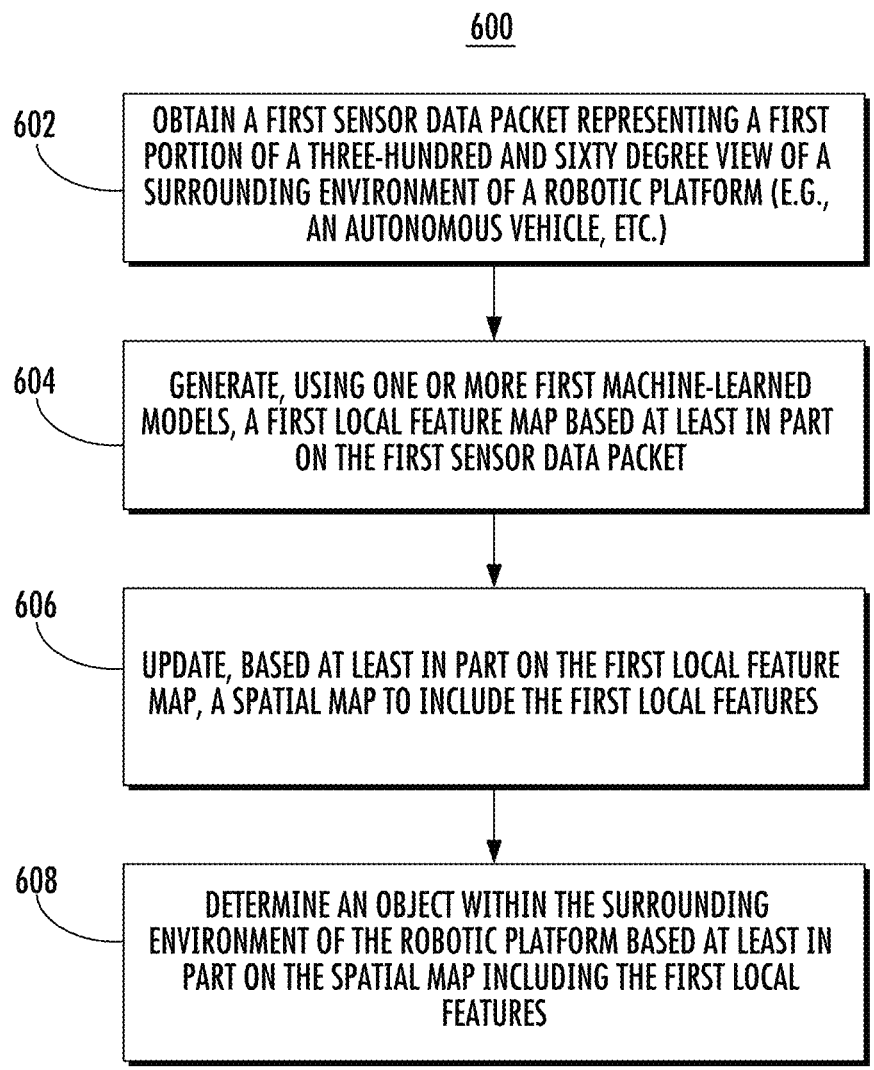
FIG. 6 depicts a flowchart of an example method for updating a spatial map and determining an object according to aspects of the present disclosure.

FIG. 6 depicts a flowchart of a method 600 for updating a spatial map and determining an object according to aspects of the present disclosure. One or more portion(s) of the method 600 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300, packet processing system 500/520, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1-3, 5, 10, etc.), for example, to generate object determination data and updated spatial maps. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

At 602, the method 600 can include obtaining a first sensor data packet representing a first portion of a view (e.g., a three-hundred and sixty degree view) of a surrounding environment of a robotic platform. The robotic platform can include an autonomous vehicle. For example, a computing system (e.g., robotic platform 105, vehicle computing system 210, operations computing system(s) 290A, remote computing system(s) 290B, system 300, packet processing system 500/520, etc.) can obtain a first sensor data packet. The first sensor data packet can include point data generated with one or more sensors (e.g., point cloud data of LIDAR sensor(s), RADAR sensor(s), etc.).

At 604, the method 600 can include generating, using one or more first machine-learned models, a first local feature map based at least in part on the first sensor data packet. For example, the computing system can include one or more convolutional models for generating a two-dimensional representation of the point cloud data that is then processed with a 2D convolution to generate the first local feature map. The first local feature map can include one or more first local features. As described herein, the first local features can include, for example, positional data associated with an object appearing in the first portion of the three-hundred and sixty degree view of the surrounding environment.

At 606, the method 600 can include updating, based at least in part on the first local feature map, a spatial map to include the first local features. For example, the computing system can obtain a spatial map (e.g., stored in a multi-scale spatial memory, etc.) and augment the spatial map to include one or more local features from the first local feature map. As described herein, the local feature map can be updated based on the first sensor data packet in order to provide an update on the surrounding environment. In some implementations, the spatial map can include previously extracted local features associated with a previous sensor data packet representing a different portion of the three-hundred and sixty degree view of the surrounding environment than the first portion.

At 608, the method 600 can include determining an object within the surrounding environment of the robotic platform based at least in part on the spatial map including the first local features. For example, the computing system can process the updated spatial map with one or more classification models to determine if the local features in the spatial map are indicative of one or more objects in the surrounding environment. This can include determining the position, bounding shape, classification, etc. of the object within the surrounding environment. In some implementations, as described herein, a robotic platform (e.g., an autonomous vehicle, etc.) can be controlled based on the determination of one or more objects being present in the environment. This can include determining a motion trajectory (e.g., including one or more future locations/way points, etc.) of the robotic platform through the surrounding environment that avoids interference with the object.

Figure 7:
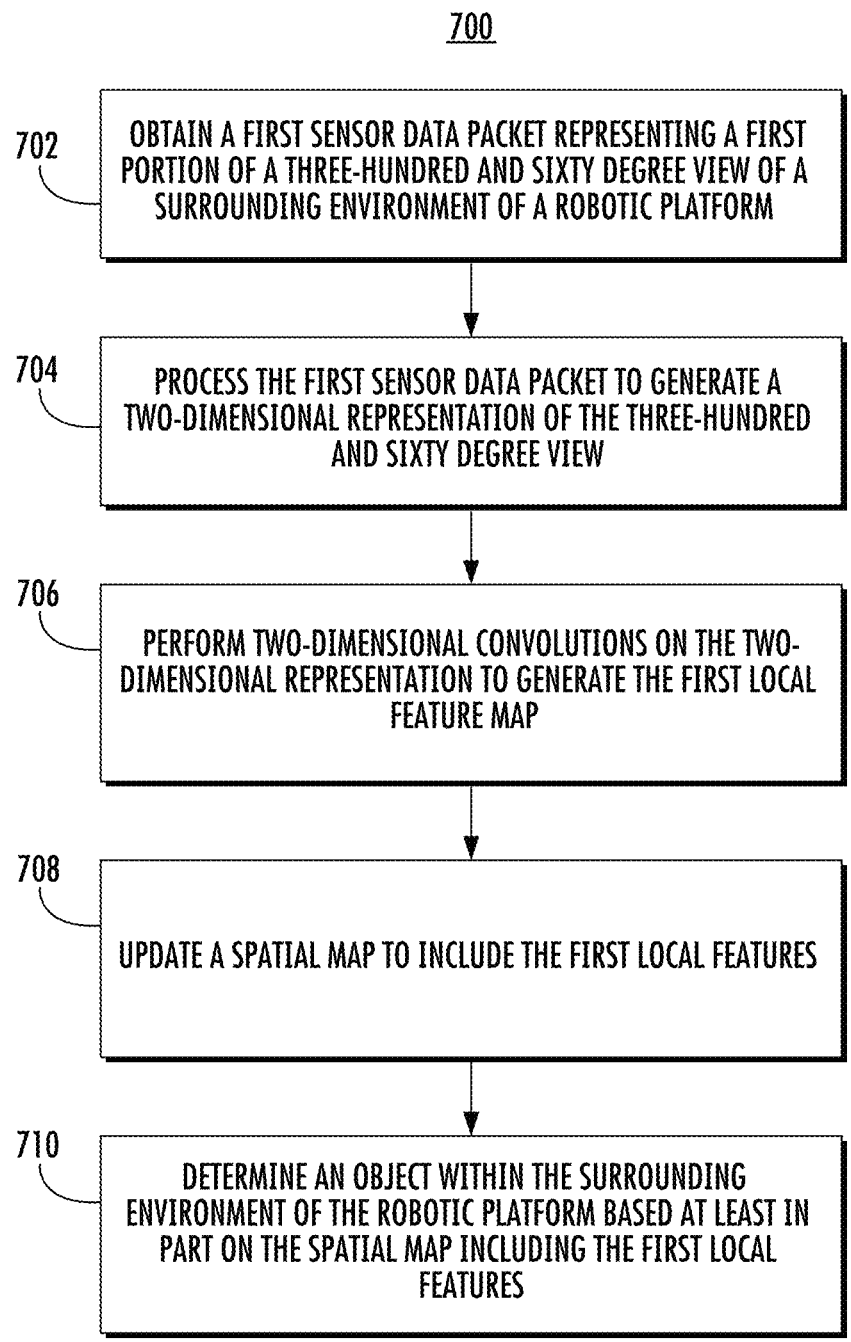
FIG. 7 depicts another flowchart of an example method for processing a sensor data packet with a machine-learned model to generate a local feature map for object determination within a surrounding environment according to aspects of the present disclosure.

FIG. 7 depicts another flowchart of a method 700 for processing a sensor data packet with a machine-learned model to generate a local feature map for object determination within a surrounding environment according to aspects of the present disclosure. One or more portion(s) of the method 700 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300, packet processing system 500/520, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1-3, 5, 10, etc.), for example, to generate a local feature map for object determination. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 702, the method 700 can include obtaining a first sensor data packet representing a first portion of a view (e.g., a three-hundred and sixty degree view) of a surrounding environment of a robotic platform (e.g., an autonomous vehicle, etc.). For example, a computing system (e.g., robotic platform 105, vehicle computing system 210, operations computing system(s) 290A, remote computing system(s) 290B, system 300, packet processing system 500/520, etc.) can obtain the first sensor data packet by obtaining sensor data captured during a certain time with one or more sensors (e.g., LIDAR sensor(s), RADAR sensor(s), etc.).

At 704, the method 700 can include processing the first sensor data packet to generate a two-dimensional representation of the three-hundred and sixty degree view. For example, the computing system can voxelize and rasterize the first sensor data packet to generate pixel maps of one or more channel dimensions. The two-dimensional representation can include a BEV image of the surrounding environment generated based at least in part on the first sensor data packet.

At 706, the method 700 can include performing two-dimensional convolutions on the two-dimensional representation to generate the first local feature map. For example, the computing system can determine a minimal region that includes all the points of the first sensor data packet. The minimal region can be processed with the two-dimensional convolutions to extract one or more first local features. The first local feature(s) can be used to generate the first local feature map (e.g., by recording the features to an associated data structure, etc.).

At 708, the method 700 can include updating a spatial map to include the first local features. For example, the computing system can generate an updated spatial map using the first local feature map and previous computations. In some implementations, updating the spatial map can involve replacing previous data with data from the first local feature map. Additionally or alternatively, the spatial map may be generated based at least in part on one or more HD maps. The HD maps can be descriptive of the environment. For example, the HD map can include lane representations in a bird's eye view or a floor layout of a building.

At 710, the method 700 can include determining an object within the surrounding environment of the robotic platform based at least in part on the spatial map including the first local features. For example, the computing system can include one or more detection headers for processing the spatial map to determine if one or more objects are in the surrounding environment. The detection header can be trained with labeled data sets and may be evaluated based on a classification loss or a regression loss.

Figure 8:
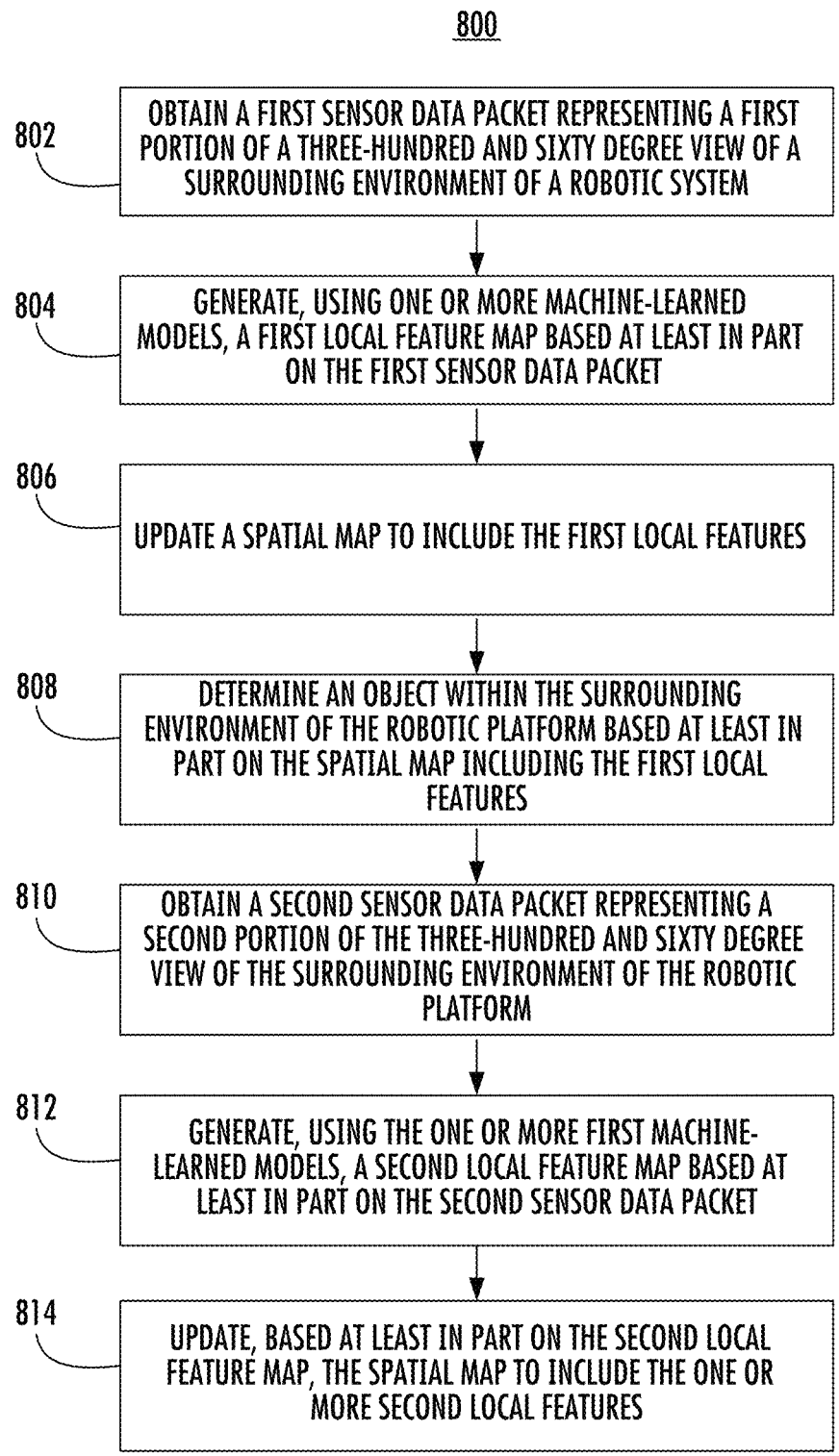
FIG. 8 depicts a flowchart of an example method for updating a spatial map and determining an object according to aspects of the present disclosure.

FIG. 8 depicts a flowchart of a method 800 for updating a spatial map and determining an object according to aspects of the present disclosure. One or more portion(s) of the method 800 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300, packet processing system 500/520, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-3, 5, 10, etc.), for example, to generate object determination data and updated spatial maps. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 802, the method 800 can include obtaining a first sensor data packet representing a first portion of a view (e.g., a three-hundred and sixty degree view) of a surrounding environment of a robotic platform. For example, a computing system (e.g., robotic platform 105, vehicle computing system 210, operations computing system(s) 290A, remote computing system(s) 290B, system 300, packet processing system 500/520, etc.) can obtain point data for a degree slice of the three-hundred and sixty degree view (e.g., a degree slice between thirty degrees and forty-five degrees, such as thirty-six degrees, etc.). The sensor data can include three-dimensional LIDAR point cloud data, RADAR data, image data, or other data related to depths of the environment.

At 804, the method 800 can include generating, using one or more machine-learned models, a first local feature map based at least in part on the first sensor data packet. For example, the computing system can process the first sensor data packet with one or more convolutional sub-blocks to generate the first local feature map. The first local feature map can be indicative of one or more first local features associated with the first portion of the three-hundred and sixty degree view of the surrounding environment. In some implementations, the one or more machine-learned models can be trained sequentially with a plurality of training data sets. Training may involve the use of backpropagation, and each training data set may represent training packets at sequential time steps.

At 806, the method 800 can include updating a spatial map to include the first local features. For example, the computing system can obtain previous computations and generate an updated spatial map based on the previous computations and the first local feature map. The spatial map can include previously extracted local features associated with a previous sensor data packet representing a different portion of the three-hundred and sixty degree view of the surrounding environment than the first portion. In some implementations, updating the spatial map can include processing the first local feature map with one or more second machine-learned models, and the one or more second machine-learned models can be configured to interpolate the first local feature map to a scale and perform feature-wise concatenation of the first local feature map and the spatial map to update the spatial map based at least in part on the first sensor data packet.

At 808, the method 800 can include determining an object within the surrounding environment of the robotic platform based at least in part on the spatial map including the first local features. For example, the computing system can include one or more first machine-learned models for generating the local feature maps, one or more second machine-learned models for interpolation and concatenation to update the spatial map, and one or more third machine-learned models for classifying the one or more local features to determine an object is in the environment. In some implementations, determining the object is in the environment can include obtaining map data and fusing the map data with the spatial map.

At 810, the method 800 can include obtaining a second sensor data packet representing a second portion of the view (e.g., the three-hundred and sixty degree view) of the surrounding environment of the robotic platform. For example, the computing system can obtain a second set of point data. The second portion can be adjacent to the first portion and may be of equal size to the first portion. The second sensor data packet can be generated and obtained after the first sensor data packet is generated and obtained. The first sensor data packet and the second sensor data packet can be generated using a rolling shutter LIDAR sensor.

Additionally or alternatively, the first sensor data packet can be obtained in a streaming manner at a first time when the first sensor data packet is acquired through a sensor system, and the second sensor data packet can be obtained in the streaming manner at a second time when the second sensor data packet is acquired through the sensor system after the first sensor data packet.

At 812, the method 850 can include generating, using the one or more first machine-learned models, a second local feature map based at least in part on the second sensor data packet. For example, the second local feature map can be indicative of one or more second local features associated with the second portion of the three-hundred and sixty degree view of the surrounding environment.

At 814, the method 850 can include updating, based at least in part on the second local feature map, the spatial map to include the one or more second local features. For example, the spatial map can include previously extracted local features associated with a previous sensor data packet representing a different portion of the three-hundred and sixty degree view of the surrounding environment than the second portion. The spatial map being updated can include one or more first local features determined from the first sensor data packet. The updated spatial map with the first local features and the second local features can be processed to determine one or more second objects are in the surrounding environment. In some implementations, only a portion of the object can be viewable in the first portion associated with the first sensor data packet. This can be due to a partial occlusion or because only a portion of the object is within the associated thirty-six degree field of view of the first sensor data packet. The processing of the second sensor data packet can allow for a more complete view of the object as additional portions of the object become viewable or the occlusion is reduced.

Figure 9:
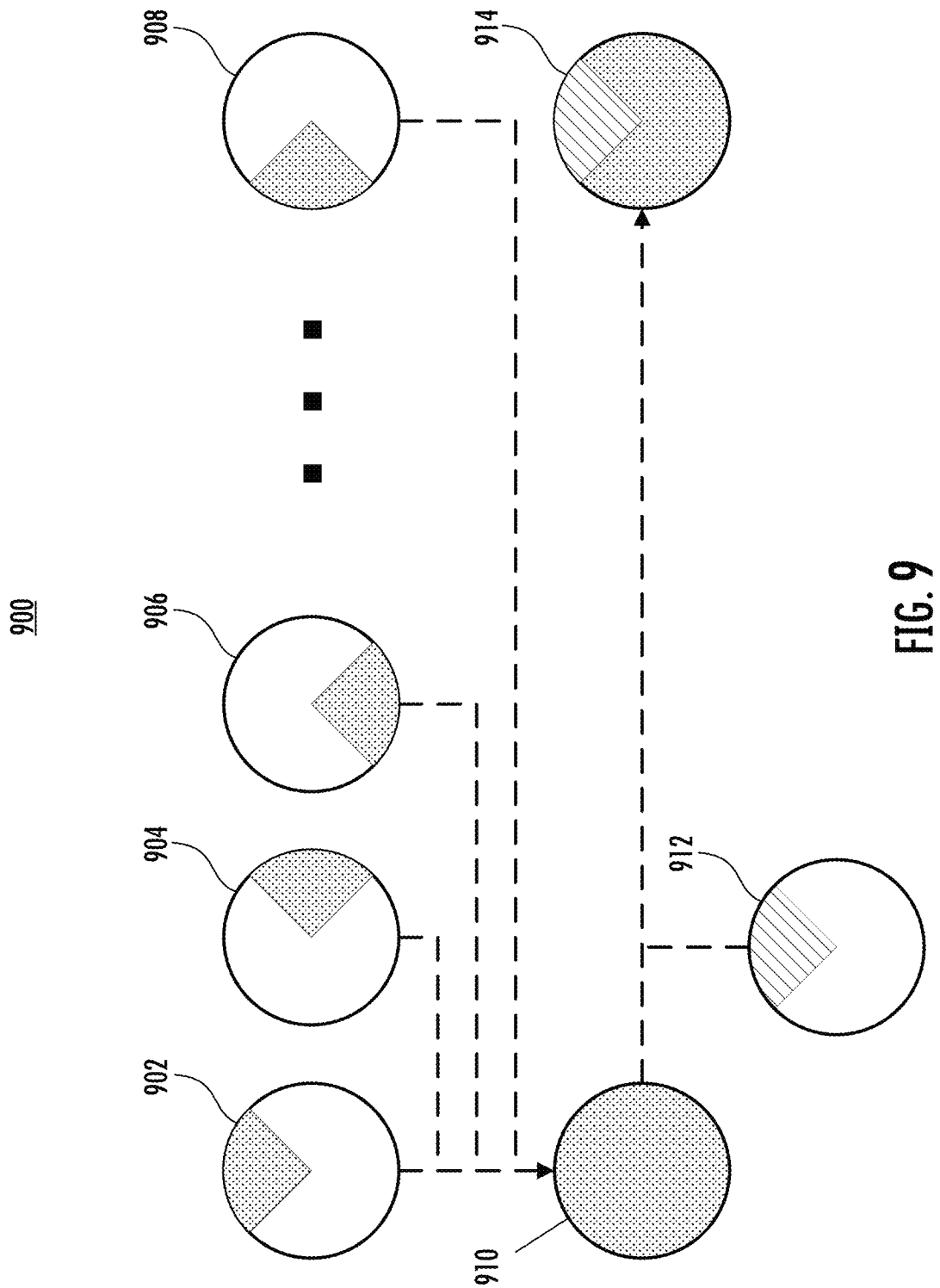
FIG. 9 depicts example updates according to example implementations of the present disclosure.

FIG. 9 depicts an illustration of example updates based on sensor data packet processing 900. The first local feature map 902, the second local feature map 904, the third local feature map 906, and the nth local feature map 908 can be generated individually and sequentially based on their own respective sensor data packets. The local feature maps can be utilized to update a spatial map after each local feature map is generated. The local feature maps can be used to fully update data on the environment after a full sweep similar to full sweep processing 530; however, packet processing 520 can be more computationally efficient with more intervals of updates. For example, after sensor data is processed for each portion of the environment, a fully updated spatial map 910 can be generated with local features indicative of the full three-hundred and sixty degree view.

Moreover, the updated spatial map can continue to be updated. For example, an (n+1) sensor data packet can be processed to generate an (n+1) local feature map 912. The (n+1) local feature map 912 can be used to update the spatial map and replace or supplement the data generated based on the first local feature map 902. This can result in updated spatial map 914.

Figure 10:
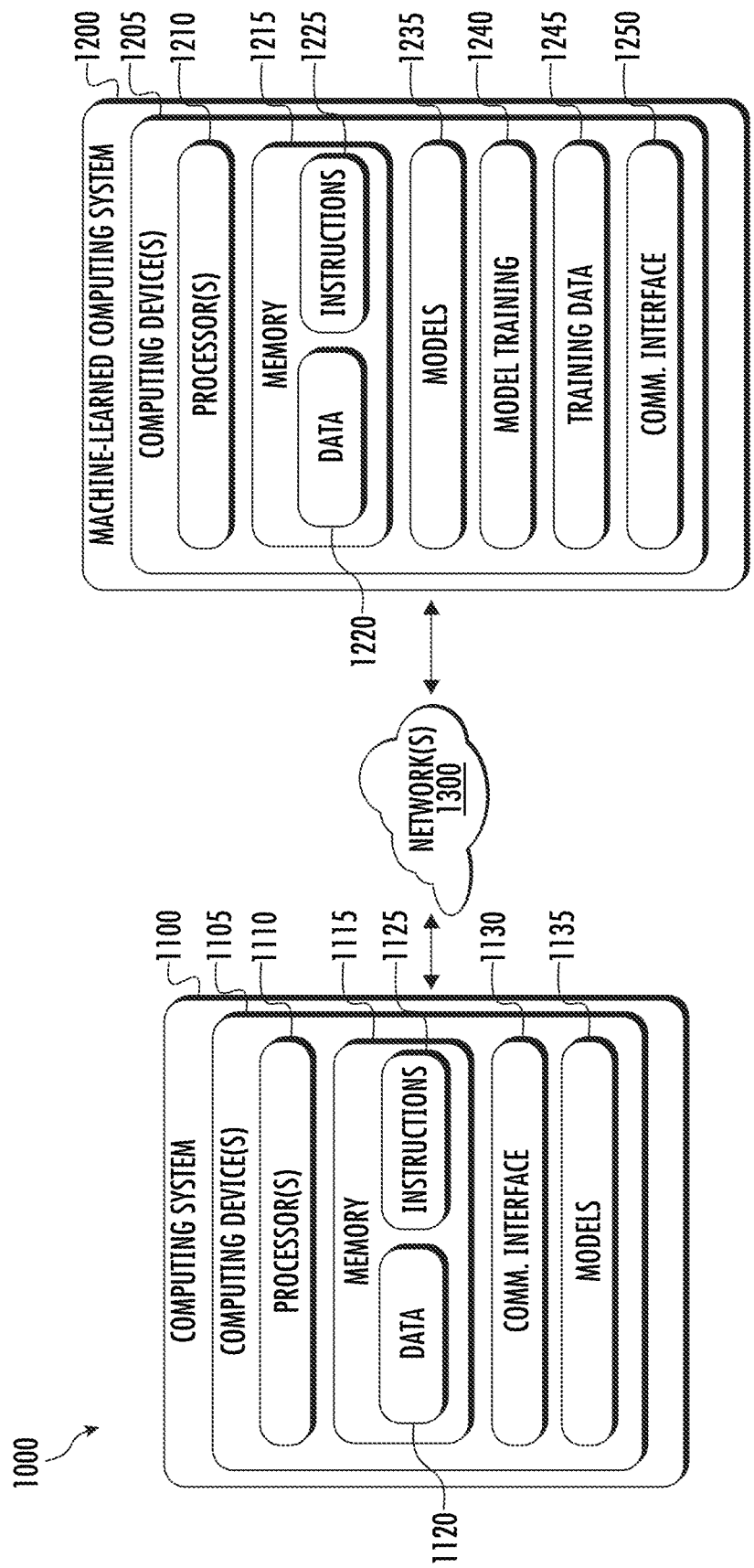
FIG. 10 depicts a block diagram of an example computing system according to example embodiments of the present disclosure.

FIG. 10 depicts a block diagram of an example computing system 1000 according to example embodiments of the present disclosure. The example system 1000 includes a computing system 1100 and a machine learning computing system 1200 that are communicatively coupled over one or more networks 1300.

In some implementations, the computing system 1100 can perform one or more observation tasks such as, for example, by obtaining sensor data associated with an environment. In some implementations, the computing system 1100 can be included in a robotic platform. For example, the computing system 1100 can be on-board an autonomous vehicle. In other implementations, the computing system 1100 is not located on-board a robotic platform. The computing system 1100 can include one or more distinct physical computing devices 1105.

The computing system 1100 (or one or more computing device(s) 1105 thereof) can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices, etc.) can store data 1120 that can be obtained, received, accessed, written, manipulated, created, or stored. The data 1120 can include, for instance, sensor data, sensor data packets, models, feature data, local feature maps, spatial maps, data associated with objects (e.g., classifications, bounding shapes, etc.), map data, simulation data, or any other data or information described herein. In some implementations, the computing system 1100 can obtain data from one or more memory device(s) that are remote from the computing system 1100.

The memory 1115 can also store computer-readable instructions 1125 that can be executed by the one or more processors 1120. The instructions 1125 can be software written in any suitable programming language or can be implemented in hardware. Additionally, or alternatively, the instructions 1125 can be executed in logically or virtually separate threads on processor(s) 1110. The memory 1115 can include a multi-scale memory, as described herein.

For example, the memory 1115 can store instructions 1125 that when executed by the one or more processors 1110 cause the one or more processors 1110 (the computing system 1100) to perform any of the operations, functions, or methods/processes described herein, including, for example, obtain sensor data, generate a local feature map, update a spatial map, determine an object is in the environment, control motion, generate simulation data, etc.

According to an aspect of the present disclosure, the computing system 1100 can store or include one or more machine-learned models 1135. As examples, the machine-learned models 1135 can be or can otherwise include various machine-learned models such as, for example, inpainting networks, generative adversarial networks, neural networks (e.g., deep neural networks, etc.), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks, etc.), convolutional neural networks, or other forms of neural networks.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110, etc.). In particular, the computing system 1100 can implement the machine learned model(s) 1135 to generate local feature maps, update spatial maps, or determine objects are in the environment.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices, etc.) can store data 1220 that can be obtained, received, accessed, written, manipulated, created, or stored. The data 1220 can include, for instance, sensor data, sensor data packets, models, feature data, local feature maps, spatial maps, data associated with objects (e.g., classifications, etc.), map data, simulation data, data communicated to/from a vehicle, simulation data, or any other data or information described herein. In some implementations, the machine learning computing system 1200 can obtain data from one or more memory device(s) that are remote from the machine learning computing system 1200.

The memory 1210 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system) to perform any of the operations, functions, methods, or processes described herein, including, for example, training a machine-learned convolutional model, interpolation model, concatenation model, self-attention model, classification model, etc.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition, or alternatively to the model(s) 1235 at the computing system 1100, the machine learning computing system 1200 can include one or more machine-learned models 1235. As examples, the machine-learned models 1235 can be or can otherwise include various machine-learned models such as, for example, inpainting networks, generative adversarial networks, neural networks (e.g., deep neural networks, etc.), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks, etc.), convolutional neural networks, or other forms of neural networks.

In some implementations, the machine learning computing system 1200 or the computing system 1100 can train the machine-learned models 1135 or 1235 through use of a model trainer 1240. The model trainer 1240 can train the machine-learned models 1135 or 1235 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

In particular, the model trainer 1240 can train a machine-learned model 1135 or 1235 based on a set of training data 1245. The training data 1245 can include, for example, labeled sequential sensor data indicative of portions of one or more environments at different timesteps. In some implementations, the training data can include environment(s) previously recorded by the autonomous vehicle with one or more objects. The model trainer 1240 can be implemented in hardware, firmware, or software controlling one or more processors.

FIG. 11 depicts a block diagram of an example process 1400 for training one or more machine-learned models for sensor data packet processing according to aspects of the present disclosure. More specifically, the example process 1400 depicts an example training process using a multi-task loss function.

The training process 1400 can include obtaining or generating a plurality of training datasets 1402. The training datasets 1402 can include a plurality of training sensor data packets. The training sensor data packets can include sequential packets that may be input into the one or more machine-learned models sequentially (e.g., chronologically, etc.). The training sensor data packets can be descriptive or indicative of one or more training environments with known depths and known objects. The training datasets 1402 can further include one or more labels (e.g., ground truth box labels indicating the actual location of objects and features and ground truth classification labels indicating the actual classification and score for the features identified in the environment, etc.).

The training sensor data packets can be input into a first machine-learned model 1404 to generate one or more local feature maps indicative of one or more local features. The one or more local feature maps can then be utilized to update one or more spatial maps. The spatial maps can be updated via interpolation and feature-wise concatenation techniques and may be updated via one or more second machine-learned models.

The updated spatial map can then be processed with the object determination model 1406 (e.g., a detection model or classification model, etc.). The object determination model 1406 can then output: (i) one or more bounding boxes 1408 indicative of feature clusters and their determined centroid and (ii) one or more classifications 1410 indicative of whether a feature cluster is indicative of an object or not.

The one or more bounding boxes 1408 can be compared against one or more ground truth box labels in order to evaluate a regression loss function 1418. Similarly, the one or more classifications 1410 can be compared against one or more ground truth classification labels in order to evaluate a classification loss function 1420. The resulting evaluations of the regression loss function 1418 and the classification loss function 1420 can be backpropagated. In response to the evaluations, one or more parameters of at least one of the first machine-learned model 1404, the second machine-learned model, or the object determination model 1406 may be adjusted based at least in part on the regression loss function 1418 or the classification loss function 1420.

FIG. 12 depicts a flowchart of a method 1500 for training an example machine-learned model according to aspects of the present disclosure. One or more portion(s) of the method 1500 can be implemented by a computing system that includes one or more computing devices such as, for example, the computing systems described with reference to the other figures (e.g., a system of FIG. 10, etc.). Each respective portion of the method 1500 can be performed by any (or any combination) of one or more computing devices. Moreover, one or more portion(s) of the method 1500 can be implemented as an algorithm on the hardware components of the device(s) described herein (e.g., as in FIGS. 1-3, 5, 10, etc.), for example, to train machine-learned models. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 12 is described with reference to elements/terms described with respect to other systems and figures for exemplary illustrated purposes and is not meant to be limiting. One or more portions of method 1500 can be performed additionally, or alternatively, by other systems.

At 1502, the method 1500 can include generating training data for training a first machine-learned model. For example, a computing system (e.g., a model trainer, etc.) can generate the training data for training the first machine-learned model. The training data can include a plurality of training sensor data packets or a set of respective training labels for the plurality of training sensor data packets.

The training data can be collected using one or more robotic platforms (e.g., robotic platform 105, etc.) or the sensors thereof as the robotic platform is within its environment. By way of example, the training data can be collected using one or more autonomous vehicle(s) (e.g., robotic platform 105, autonomous vehicle 205, etc.) or sensors thereof as the vehicle(s) operates along one or more travel ways. The training data can include LiDAR point clouds (e.g., collected using LiDAR sensors of a robotic platform, etc.) or high definition map information (e.g., structured lane topology data, etc.). The plurality of sensor data packets and the plurality of maps can be scaled training and evaluation. In some implementations, a "ground-truth" labels or ground truth maps can be created in which objects, boxes, or features can be identified.

Due to the sequential nature of the spatial memory, the one or more machine-learned models can be trained sequentially through examples that contain a plurality of sensor data packets, and backpropagation through time can be used to compute gradients across the memory. Furthermore, the one or more machine-learned models (e.g., the first machine learned model 1404, the second machine-learned model, and the classification model (e.g., the object determination model 1406), etc.) may also be trained to remember by supervising the model(s) on objects with 0 points as long as it was seen in any of the previous packets, as previously described herein. In practice, due to GPU memory constraints, the system may only compute the forward pass in the first subset of packets, then forward and backward through time in the last subset of packets.

At 1504, the method 1500 can include selecting a training instance based, at least in part, on the training data. For example, a computing system can select the training instance based, at least in part, on the training data. The training instance can include training sensor data packets indicative of at least a portion of a surrounding environment with at least one object for detection.

For example, as described above, the training datasets 1402 can include a plurality of sensor data packets from a plurality of different degree slices over a plurality of different timesteps. In addition, in some implementations, the training datasets can include a plurality of objects (e.g., synthetic three-dimensional object meshes such as car meshes, pedestrian meshes, etc.) rendered within the sensor data packet. Each object can be assigned one or more feasible trajectories and rendered within at least one of the plurality of sensor data packets of the training dataset based, at least in part, on the respectively assigned trajectory. In some implementations, the feasible trajectories can be determined based, at least in part, on one or more heuristics such as, for example, vehicle (1) can only travel along lanes; (2) can randomly turn left, right, or continue straight at each intersection; (3) cannot interfere with one another; or any other heuristic for controlling the motion of objects rendered within the training sequence.

At 1506, the method 1500 can include inputting the training instance into the first machine-learned model. For example, a computing system can input the training instance into the first machine-learned model.

At 1508, the method 1500 can include generating loss metric(s) for the first machine-learned model based on output(s) of at least a portion of the first machine-learned model in response to the training instance. For example, a computing system can generate the loss metric(s) for the first machine-learned model based on the output(s) of at least the portion of the first machine-learned model in response to the training instance. The loss metric(s), for example, can include at least one of a regression loss (e.g., a weighted sum of L1 losses, etc.), a classification loss, adversarial loss, a multi-task loss, or a perceptual loss.

In some implementations, the loss metric(s) can be associated with a plurality of loss terms. The loss terms can include at least a first loss term associated with the determination or generation of bounding boxes, a second loss term associated with the classification of features, or a third loss term associated with the generation of a two-dimensional representations, or a fourth loss term associated with the extraction of local features from a two-dimensional representation. For example, the regression loss metric (e.g., the first loss term associated with the determination or generation of bounding boxes, etc.) can quantify the accuracy of the predicted bounding boxes output by at least a portion of the one or more machine-learned model(s). As another example, the fine-classification loss metric (e.g., the second loss term associated with the classification of features, etc.) can quantify the accuracy of the classification or object determination output by at least another portion of the one or more machine-learned model(s).

At 1510, the method 1500 can include modifying at least the portion of the first machine-learned model based, at least in part, on at least one of the loss metric(s). For example, a computing system can modify at least the portion of the first machine-learned model based, at least in part, on at least one of the loss metric(s). For example, the first machine-learned model can be trained with a multi-task loss function (denoted as $\mathcal{L}$).

The first machine-learned model (or portion thereof) can be modified to minimize a loss function associated with the loss metric(s). For example, the first machine-learned model can be trained with a multi-task loss function (denoted as $\mathcal{L}$) to minimize a Wasserstein distance. By way of example, the model can be trained over the overall training function:

$$\mathcal{L} = \mathcal{L}_{reg} + \alpha \mathcal{L}_{cls}$$

The terms of the overall training function can include a first term indicative of the regression loss metric. The regression loss can include a weighted sum of the smooth L1 loss between the predicted box parameters and the ground truth (as denoted below).

$$\mathcal{L}_{reg}(y, \hat{y}) = \frac{1}{N} \sum_{i=0}^{N} \sum_{d \in (x, y, \log w, \log l, \theta_1, \theta_2)} \gamma_d \times \text{smooth}_{L1}\left(y_d^i - \hat{y}_d^i\right)$$

$$\text{smooth}_{L1}(x) = \begin{cases} 0.5x^2 & \text{if } |x| \leq 1 \\ |x| - 0.5 & \text{otherwise} \end{cases}.$$

The regression loss can include $\gamma$ values of 1.0 for x, y, log w, log l, and 2.0 for $\theta_1$, $\theta_2$ can be used. For pedestrians the log w, log l, $\theta_1$, and $\theta_2$ can be omitted as the metric may only be concerned with predicting the centroid (x and y).

In addition, the terms can include a second term indicative of the classification loss metric. The classification loss can include a binary cross entropy between the predicted classification scores and the ground truth. Due to a severe imbalance between positive and negative anchors given that most pixels in the BEV scene do not contain an object, the metric can employ hard negative mining. Thus, the loss can become:

$$\mathcal{L}_{cls}(y, \hat{y}) = \frac{1}{N}\sum_{i=0}^{N}\hat{y}_{pos}^{i} + \frac{1}{K}\sum_{i=0}^{N}\mathbb{1}[i \in N_K](1 - \hat{y}_{neg}^{i})\log(1 - y),$$

where K can be a set containing K hard negative anchors. The set can be obtained by first randomly sampling different classes of objects, and then picking a certain number (e.g., 20, etc.) with highest loss for each class.

In addition, the terms of the overall training function can include one or more other terms for evaluating one or more other parameters of the one or more machine-learned models. Although FIG. 12 describes systems and methods for training the first machine-learned model, similar methods and systems can be applied to train the one or more second machine-learned models and the one or more object determination models disclosed herein.

Returning to FIG. 10, the computing system 1100 and the machine learning computing system 1200 can each include a communication interface 1130 and 1250, respectively. The communication interfaces 1130/1250 can be used to communicate with one or more systems or devices, including systems or devices that are remotely located from the computing system 1100 and the machine learning computing system 1200. A communication interface 1130/1250 can include any circuits, components, software, etc. for communicating with one or more networks 1300. In some implementations, a communication interface 1130/1250 can include, for example, one or more of a communications controller, receiver, transceiver, transmitter, port, conductors, software or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1300 can be accomplished, for instance, through a network interface using any type of protocol, protection scheme, encoding, format, packaging, etc.

FIG. 10 illustrates one example computing system 1000 that can be used to implement the present disclosure. Other computing systems can be used as well. For example, in some implementations, the computing system 1100 can include the model trainer 1240 and the training dataset 1245. In such implementations, the machine-learned models 1240 can be both trained and used locally at the computing system 1100. As another example, in some implementations, the computing system 1100 is not connected to other computing systems.

In addition, components illustrated or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using phrases, sentences, lists, etc. of example elements joined by conjunctions such as "and," "or," "but," etc. It should be understood that such conjunctions are provided for explanatory purposes only. Lists joined by a particular conjunction such as "or," for example, can refer to "at least one of", "and/or", or "any combination of" example elements listed therein.

What is claimed is:

1. A computer-implemented method, comprising:
obtaining, from a sensor system, a stream of sensor data packets representing respective angular slices of a view of a surrounding environment of an autonomous vehicle, wherein the stream of sensor data packets includes a first sensor data packet corresponding to a first angular slice of the view that is obtained at a first time when the first sensor data packet is acquired through the sensor system;
generating a first local feature map based at least in part on the first sensor data packet, wherein the first local feature map is indicative of one or more first local features associated with the first angular slice of the view;
updating a spatial map to include the first local features, wherein the spatial map comprises previously extracted local features associated with a previous sensor data packet representing a different angular slice of the view of the surrounding environment than the first angular slice;
determining an object within the surrounding environment of the autonomous vehicle based at least in part on the spatial map including the first local features; and
controlling motion of the autonomous vehicle based at least in part on the object determined within the surrounding environment.

2. The computer-implemented method of claim 1, wherein the stream of sensor data packets are received from the sensor system and iteratively processed in a streaming fashion as respective angular slices corresponding to a three-hundred and sixty degree view are obtained and updated in the spatial map.

3. The computer-implemented method of claim 1, wherein the sensor system comprises one or more LIDAR sensors.

4. The computer-implemented method of claim 3, wherein the sensor system ingests packets of LIDAR data from the one or more LIDAR sensors and emits the stream of sensor data packets without waiting for a full sweep to be built by the one or more LIDAR sensors.

5. The computer-implemented method of claim 3, wherein the first sensor data packet comprises three-dimensional point cloud data generated by the one or more LIDAR sensors, wherein the one or more LIDAR sensors are rotated to generate sensor data packets for each respective angular slice of the view.

6. The computer-implemented method of claim 1, wherein the stream of sensor data packets further includes a second sensor data packet corresponding to a second angular slice of the view that is obtained at a second time when the second sensor data packet is acquired through the sensor system after the first sensor data packet.

7. The computer-implemented method of claim 6, further comprising:
generating a second local feature map based at least in part on the second sensor data packet, wherein the second local feature map is indicative of one or more second local features associated with the second angular slice of the view of the surrounding environment; and
updating, based at least in part on the second local feature map, the spatial map to include the one or more second local features;
wherein the second local feature map is generated after the first local feature map is generated.

8. The computer-implemented method of claim 1, wherein generating the first local feature map comprises generating a two-dimensional representation associated with the first angular slice of the view of the surrounding environment of the autonomous vehicle.

9. The computer-implemented method of claim 1, wherein determining the object comprises obtaining map data and fusing the map data with the spatial map.

10. The computer-implemented method of claim 1, wherein updating the spatial map comprises replacing one or more previous computations of the spatial map with the one or more first local features.

11. The computer-implemented method of claim 1, wherein updating the spatial map comprises:
obtaining previous computations descriptive of past computations for previous sensor data packets; and
updating spatial memory based on the previous sensor data packets and the first local feature map to update the spatial map.

12. The computer-implemented method of claim 1, wherein the spatial map is descriptive of past local feature maps generated by processing previously obtained sensor data packets.

13. A computing system comprising:
one or more processors; and
one or more computer-readable medium storing instructions for execution by the one or more processors to cause the computing system to perform operations, the operations comprising:
obtaining, from a sensor system, a stream of sensor data packets representing respective angular slices of a view of a surrounding environment of an autonomous vehicle, wherein the stream of sensor data packets includes a first sensor data packet corresponding to a first angular slice of the view that is obtained at a first time when the first sensor data packet is acquired through the sensor system;
generating a first local feature map based at least in part on the first sensor data packet, wherein the first local feature map is indicative of one or more first local features associated with the first angular slice of the view;
updating a spatial map to include the first local features, wherein the spatial map comprises previously extracted local features associated with a previous sensor data packet representing a different angular slice of the view of the surrounding environment than the first angular slice;
determining an object within the surrounding environment of the autonomous vehicle based at least in part on the spatial map including the first local features; and
controlling motion of the autonomous vehicle based at least in part on the object determined within the surrounding environment.

14. The computing system of claim 13, wherein the stream of sensor data packets are received from the sensor system and iteratively processed in a streaming fashion as respective angular slices corresponding to a three-hundred and sixty degree view are obtained and updated in the spatial map.

15. The computing system of claim 13, wherein:
the sensor system comprises one or more LIDAR sensors; and
the sensor system ingests packets of LIDAR data from the one or more LIDAR sensors and emits the stream of sensor data packets without waiting for a full sweep to be built by the one or more LIDAR sensors.

16. The computing system of claim 15, wherein the first sensor data packet comprises three-dimensional point cloud data generated by the one or more LIDAR sensors, wherein the one or more LIDAR sensors are rotated to generate sensor data packets for each respective angular slice of the view.

17. The computing system of claim 13, wherein the stream of sensor data packets further includes a second sensor data packet corresponding to a second angular slice of the view that is obtained at a second time when the second sensor data packet is acquired through the sensor system after the first sensor data packet.

18. The computing system of claim 17, the operations further comprising:
generating a second local feature map based at least in part on the second sensor data packet, wherein the second local feature map is indicative of one or more second local features associated with the second angular slice of the view of the surrounding environment; and
updating, based at least in part on the second local feature map, the spatial map to include the one or more second local features;
wherein the second local feature map is generated after the first local feature map is generated.

19. An autonomous vehicle comprising:
a sensor system comprising one or more sensors;
one or more processors; and
one or more computer-readable medium storing instructions for execution by the one or more processors to cause the autonomous vehicle to perform operations, the operations comprising:
obtaining, from the sensor system, a stream of sensor data packets representing respective angular slices of a view of a surrounding environment of an autonomous vehicle, wherein the stream of sensor data packets includes a first sensor data packet corresponding to a first angular slice of the view that is obtained at a first time when the first sensor data packet is acquired through the sensor system;
generating a first local feature map based at least in part on the first sensor data packet, wherein the first local feature map is indicative of one or more first local features associated with the first angular slice of the view;

updating a spatial map to include the first local features, wherein the spatial map comprises previously extracted local features associated with a previous sensor data packet representing a different angular slice of the view of the surrounding environment than the first angular slice;

determining an object within the surrounding environment of the autonomous vehicle based at least in part on the spatial map including the first local features; and controlling motion of the autonomous vehicle based at least in part on the object determined within the surrounding environment.

20. The autonomous vehicle of claim 19, wherein the stream of sensor data packets are received from the sensor system and iteratively processed in a streaming fashion as respective angular slices corresponding to a three-hundred and sixty degree view are obtained and updated in the spatial map.

\* \* \* \* \*